(12) United States Patent
Tippetts

(10) Patent No.: US 7,735,749 B2
(45) Date of Patent: Jun. 15, 2010

(54) DISPLAY FOUNTAIN, SYSTEM, ARRAY AND WIND DETECTOR

(76) Inventor: John Tippetts, Barncroft, Vicarage Lane, Dore, Sheffield, S17 3GX (GB)

( * ) Notice: Subject to any disclaimer, the term of this patent is extended or adjusted under 35 U.S.C. 154(b) by 1418 days.

(21) Appl. No.: 10/537,273

(22) PCT Filed: Nov. 26, 2003

(86) PCT No.: PCT/GB03/05146

§ 371 (c)(1), (2), (4) Date: May 26, 2005

(87) PCT Pub. No.: WO2004/047997

PCT Pub. Date: Jun. 10, 2004

(65) Prior Publication Data

US 2006/0157596 A1 Jul. 20, 2006

(30) Foreign Application Priority Data

Nov. 26, 2002 (GB) ................................. 0227514.7

(51) Int. Cl.
*E03B 9/20* (2006.01)
(52) U.S. Cl. ..................... 239/16; 137/624.27; 137/9
(58) Field of Classification Search ....................... None
See application file for complete search history.

(56) References Cited

U.S. PATENT DOCUMENTS

| | | | | | |
|---|---|---|---|---|---|
| 3,595,479 A | * | 7/1971 | Freeman | ...................... | 239/23 |
| 3,675,672 A | * | 7/1972 | Freeman | ...................... | 137/804 |
| 4,955,547 A | * | 9/1990 | Woods | ...................... | 239/589.1 |
| 4,978,066 A | * | 12/1990 | Fuller et al. | ...................... | 239/12 |
| 5,749,518 A | * | 5/1998 | Wang | ...................... | 239/17 |

* cited by examiner

*Primary Examiner*—Andre J Allen
(74) *Attorney, Agent, or Firm*—Sheldon Mak Rose & Anderson PC; Jeffrey G. Sheldon; Laura M. Lloyd

(57) ABSTRACT

A fountain (50) comprises a supply of water under pressure, a primary fluidic diverter (10) having an input (12) for said supply, and first and second outputs (16a, b) diverging from said input. Two control ports (20a, b) are provided with control flow to direct input flow to one or other of the two outputs that lead to the two inputs of a vortex amplifier (40). This comprises a vortex chamber (54), a radial port (50), a vortex inducing port (60) and an axial output port (58). One (16a) of the diverter outputs is connected to the vortex inducing port, the other (16b) to the radial port, so that supply to said axial output port is modulated by formation of a vortex in the chamber when flow is to the vortex inducing port. The axial port leads to a nozzle whereby a vortex spray or axial jet is produced, depending on which diverter output (16a, b) is active. A wind detector (100) has a vertical jet (102) and a catcher (104) which fails to catch water from the jet in high wind conditions. The catcher feeds the control port (20a) of a diverter $10_1$, or such other pressure or flow detector as may be convenient. A fountain array of elements may comprise a number of diverters, the outputs of which have branches supplying the control ports of others in the array, whereby internal control is provided.

33 Claims, 18 Drawing Sheets

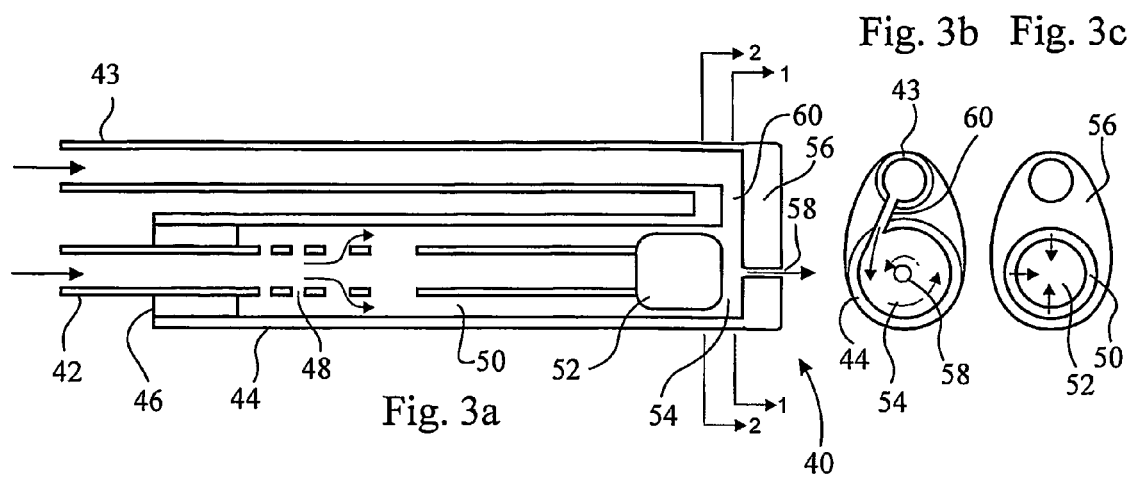
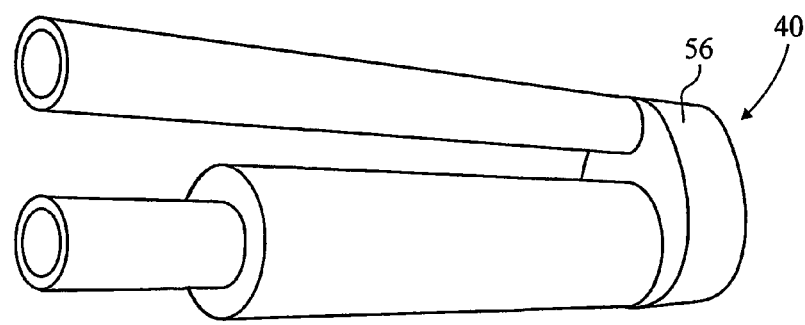
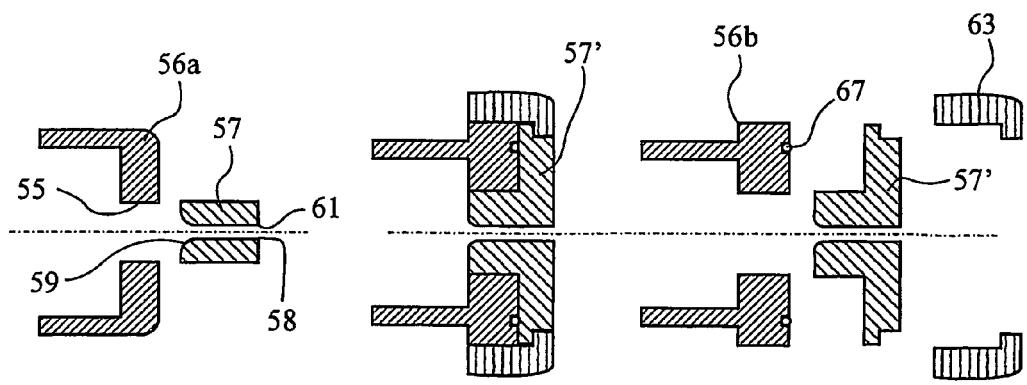

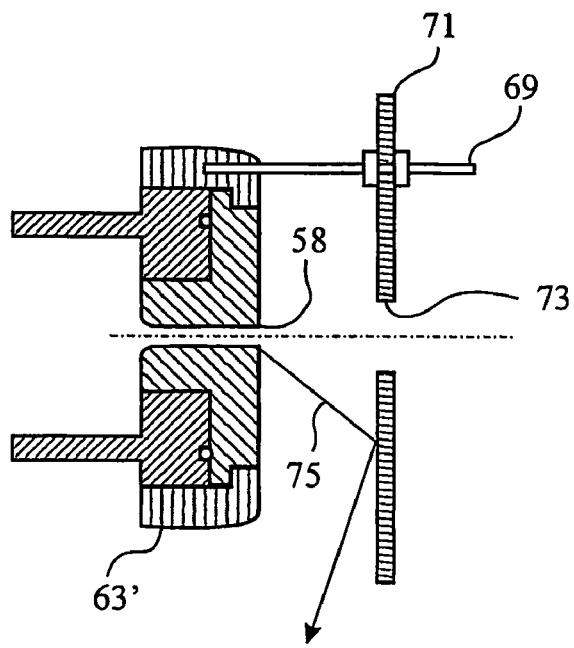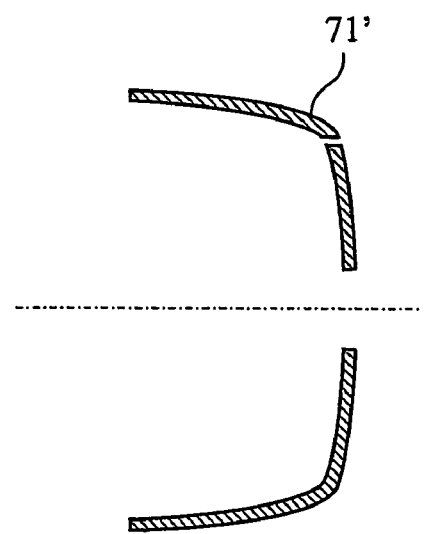
Fig. 5a    Fig. 5b
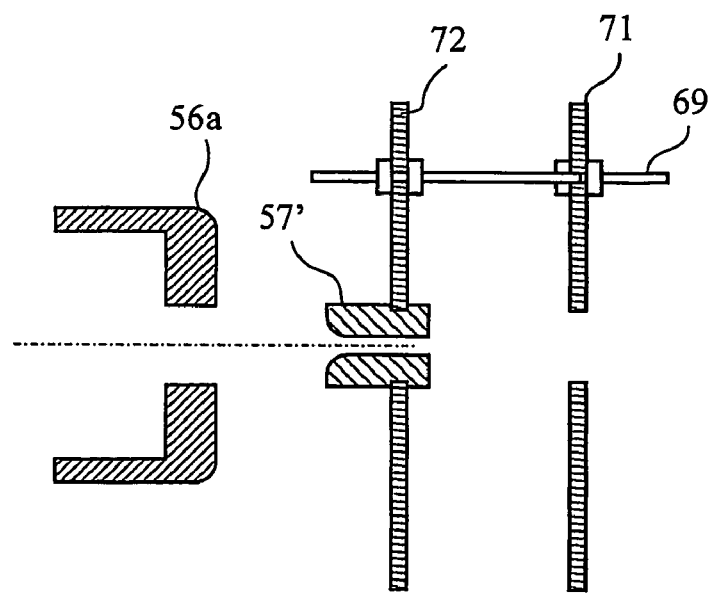
Fig. 5c

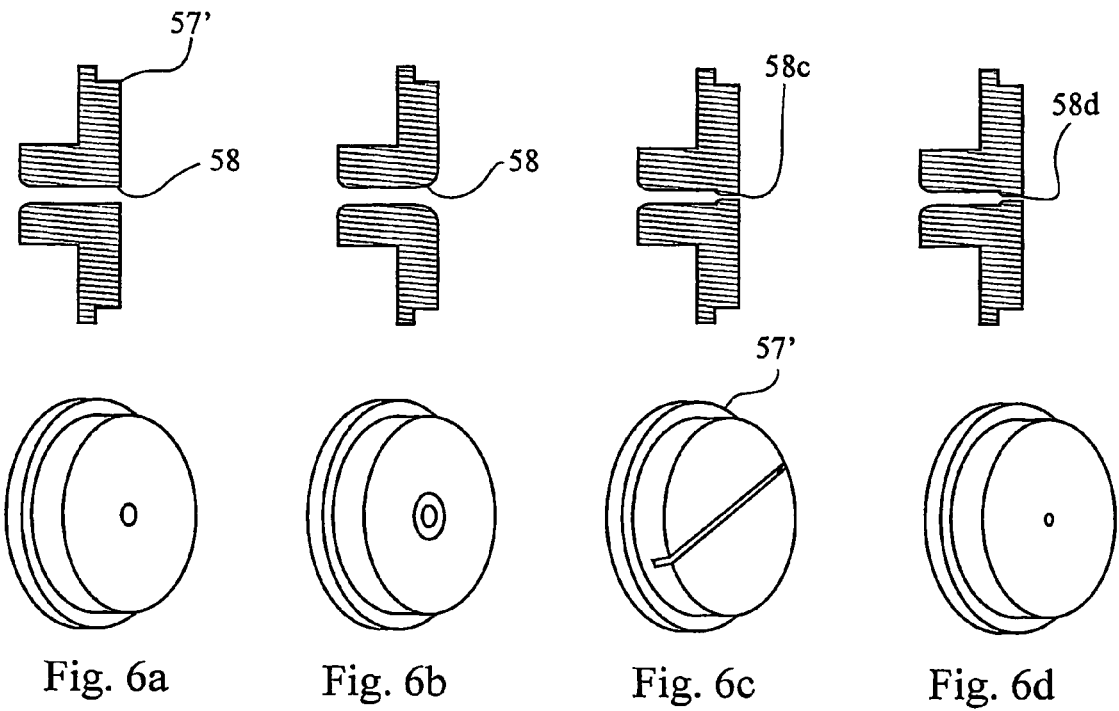
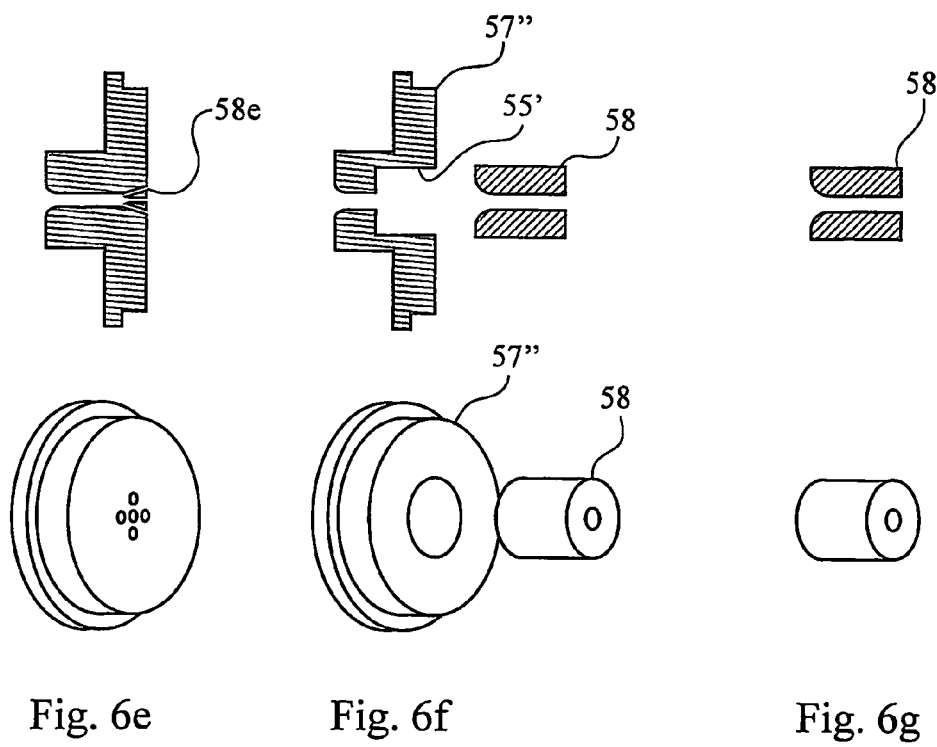
Fig. 6a   Fig. 6b   Fig. 6c   Fig. 6d
Fig. 6e   Fig. 6f   Fig. 6g

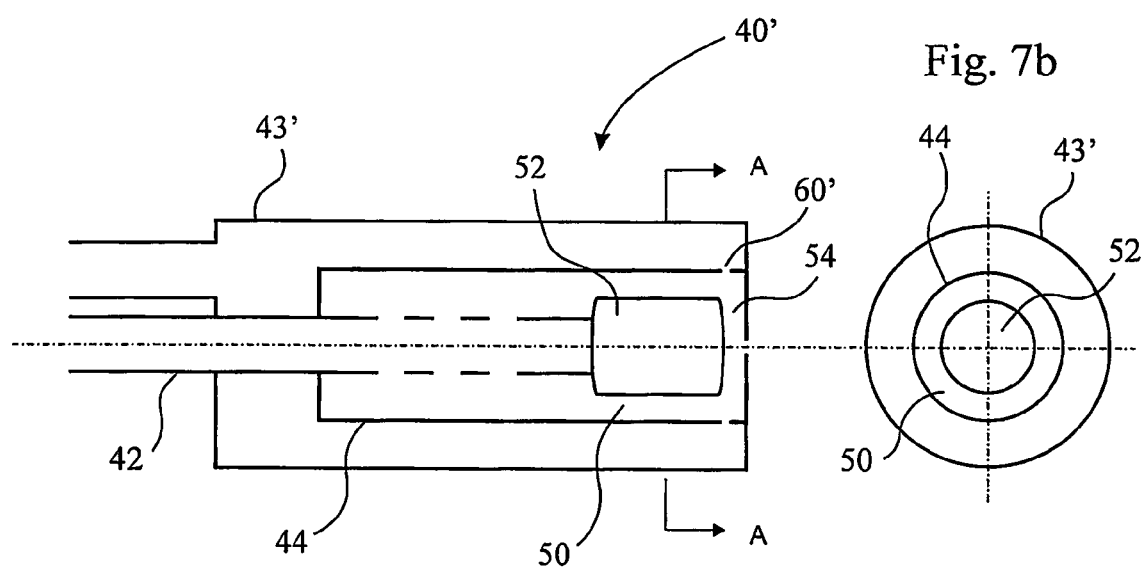
Fig. 7b
Fig. 7a
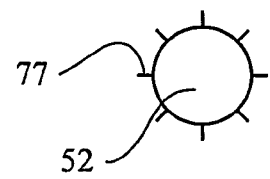
Fig. 7c
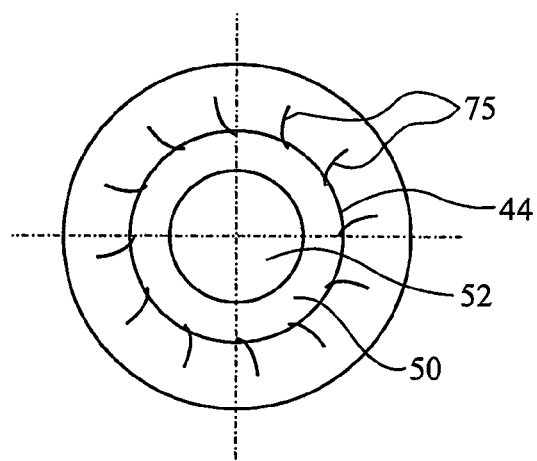
Fig. 7d

DISPLAY FOUNTAIN, SYSTEM, ARRAY AND WIND DETECTOR

CROSS-REFERENCE TO RELATED APPLICATIONS

This application claims priority of PCT Patent Application No. PCT/GB2003/005146, filed on Nov. 26, 2003 which claims priority of Great Britain Patent Application No. GB0227514.7, filed on Nov. 26, 2002, the entire contents of all of which are hereby incorporated herein by reference.

BACKGROUND OF THE INVENTION

The present invention relates to fountains, particularly display fountains, although the invention in its different aspects may also have other applications.

Display fountains come in many shapes and sizes. Water "features" are a common and increasingly popular aspect of domestic garden scenery. Larger displays are frequently employed in public places and have long been an adjunct to architectural or sculptural works. Most fountains are static, in that they have a single mode of operation—they are either on, or off. Static fountains are the simplest and least expensive, and generally only require a pump or water supply to operate. These kinds are affordable by most people and are seen in many garden ponds. Various nozzles provide different effects from sprays to jets, and may be arranged to entrain air so that a foaming spray is generated.

However, more sophisticated fountains are dynamic in that their operation is controlled, and accordingly varied, by different jets being switched on or off, or having their pressures varied, or redirected. The control arrangement is invariably electronic with greater or lesser complication, and involves the use of selectively operable mechanical valves that can interrupt flow, as may be desired. By this means a wide variety of different effects can be achieved. But such variety comes at a significant cost, not just in terms of price, but also of reliability. Fountains generally involve recycling pond or fountain pool water, and debris eventually builds up and can block valves etc.

One recent development in fountain displays is the use of slugs of water. Although a continuous jet of water involves continuous motion, this fact disguised by a complete arc of a water jet, which can appear somewhat static. If, however, slugs of water are generated, which slugs have a beginning and an end, the motion is brought home to the viewer. U.S. Pat. No. 5,979,791 and U.S. Pat. No. 6,119,955 both disclose arrangements for producing slug jets, one involving the use of a syringe-type of arrangement, and the other involving a plug rapidly releasing and closing an orifice of a chamber containing liquid under pressure.

U.S. Pat. No. 5,918,809 discloses a water display arrangement in which a float is provided with nozzles supplied by flexible water pipes, the reaction from the nozzles moving the float about on a pond or pool surface and creating interesting effects. However, mechanical switching arrangements are provided.

Numerous patents disclose fluidic arrangements for producing oscillating jets, whose main application appears to be in the automotive field for vehicle windscreen and headlight washing. Examples are to be found in U.S. Pat. No. 6,253,782, U.S. Pat. No. 5,213,269, U.S. Pat. No. 5,181,660, EP-A-0208174 U.S. Pat. No. 4,398,664, U.S. Pat. No. 452,867 and WO-A-7900361.

EP-A-0331343 discloses the use of a fluidic bistable oscillator in the production of a spray of droplets having a narrow size spectrum. SU-A-478622 discloses a display fountain using a diverter to provide alternating jets under pneumatic control.

SUMMARY

It is an object of the present invention to provide a display fountain that has opportunities for a variety of functions without the necessity of moving valves, pistons or the like mechanical components.

In accordance with a first aspect of the present invention there is provided a fountain comprising:
- a supply of water under pressure;
- a primary fluidic diverter having an input for said supply, and first and second outputs diverging from said input, two control ports provided with control flow to direct input flow to one or other of said outputs; and
- a vortex amplifier comprising a vortex chamber, a radial port, a vortex inducing port and an axial port; wherein one of said first and second primary diverter outputs is connected to said vortex inducing port and the other is connected to said radial port, said axial port leading to a nozzle whereby an alternating vortex spray or axial jet is produced. Accordingly, when the diverter switches flow to the vortex inducing port of the vortex amplifier, a vortex is induced in the vortex chamber so that flow issuing from the nozzle swirls and forms a conical spray. However, when the diverter switches flow to the radial port of the vortex amplifier, no vortex forms in the vortex chamber, the flow therein being only radial, whereby a non-swirling axial and coherent jet issues from the nozzle.

Preferably, said control ports are interconnected by an inertia loop, whereby oscillations are induced in the control flow to switch flow alternately between said first and second outputs.

Alternatively, said outputs may have restrictors therein and include feed back loops into said control ports, whereby oscillations are induced in the control flow to switch flow alternately between said first and second outputs.

Said first and second outputs of either diverter may be vented to isolate each input from the outputs, and the outputs from one another.

Any of said diverters may be cusped between said first and second outputs to increase stability of flow through said first and second outputs.

Preferably, said vortex amplifier comprises an annular chamber formed by a tubular housing and central body, supply flow to the amplifier entering said annular chamber at one end, the other end of the annular chamber being terminated by a nozzle plate defining with said central body said vortex chamber, said housing having an opening forming said vortex inducing port.

Said vortex inducing port is preferably a passage from a supply chamber outside said housing and arranged tangentially with respect to said vortex chamber. Alternatively, said vortex inducing port comprises a plurality of said openings in said housing, each opening provided with a vane to tangentially direct radial inflow from a supply chamber surrounding said housing.

Preferably, said nozzle is interchangeable with different nozzles displaying one of various spray patterns when vortex spray issues therefrom.

A spray catcher may be disposed beyond the nozzle to deflect vortex spray issuing from said nozzle, the catcher having an orifice to permit passage of said axial jet to flow unimpeded. Indeed, the catcher may be formed as an inverted cup, so as to destroy entirely said vortex spray, although still permitting the jet flow.

Alternatively, said nozzle may open into an annular diffuser to catch said vortex spray, but not said axial jet, said diffuser opening into an annular pressure plenum. The plenum may be provided with discrete nozzle exits. These can produce discrete jets and they may be spaced around the central jet to produce a crown-like spray, alternating with the central, axial jet. On the other hand, the nozzle exits may be employed for switching of other elements of a fountain system.

Two vortex amplifiers may be provided in parallel, each with its own supply to its radial port, each vortex inducing port being connected to one or other of said first and second outputs of the primary diverter.

Indeed, such an arrangement may also be provided as a component of a fluidic control arrangement in a fountain system wherein, instead of said axial outputs of the two vortex amplifiers leading to nozzles, they lead to further components of the system, and which are arranged to be controlled by greater or lesser flow rates from the vortex amplifiers that issue from said axial output depending on whether there is flow into said vortex inducing port.

Alternatively, or in addition a fountain system may include two primary diverters whose first outputs are joined together and comprise the radial input for said vortex amplifier, and whose second outputs are connected to separate vortex-inducing ports of said vortex amplifier, whereby several modes of operation of the vortex amplifier results. To achieve variety in the display, the diverters are preferably arranged deliver flow at different strengths, either by being different in size or of supplied pressure and/or flow. The diverters could be designated "strong" and "weak". For example, when the vortex inducing ports are arranged to induce a vortex in the same direction with respect to one another, then column A in the following table shows the resulting flow states in the axial outlet of the vortex amplifier. The first two columns indicate the direction in which the diverters are switched (to first or second outputs). Four possible circuit states are produced, ranging from one (first row) with zero swirl (and a strong coherent jet) to one with maximum swirl (fourth row, with both diverters inducing vortex flow). The others have intermediate swirl strengths (partial swirls 1 and 2 being different) giving a total of four possible water jet or spray effects.

Alternatively, if the vortex inducing ports are arranged to oppose one another, then the four possible flow states are as tabulated in column B. They range between zero swirl (row 1) and a high swirl state (rows 2 or 3 depending on the relative strengths of the diverter flows). This high swirl state has less swirl intensity than that of column A. The fourth row, corresponding to both diverters attempting to induce vortex flow in opposite directions produces another intermediate swirl state. Consequently this "contra-swirl" configuration produces a finer gradation of swirl intensity than that with co-directional vortex inducing ports. Small degrees of swirl cause great degrees of effect in the jet efflux. The relative swirl strengths of the partial swirl states depend on the relative strengths of the two diverters but this relativity or ranking is unimportant. The significant attribute is the ability to produce four distinct display phenomena.

TABLE I

| Diverter 1, Output in flow | Diverter 2, Output in flow | 1.1.1A Axial output from Vortex amplifier | 1.1.2B Axial output from Vortex amplifier |
|---|---|---|---|
| First | First | Non-swirl flow | Non-swirl flow |
| Second | 2. First | Partial swirl 1 | Partial swirl 1 |
| First | Second | Partial swirl 2 | Partial swirl 2 |
| Second | Second | Maximum swirl | Partial swirl 3 |

If the diverters are themselves controlled to switch at different times, the period of each phase can vary and appear somewhat random. This can be achieved, for example, by a control loop for each diverter having a different length, given that it is primarily the length of such loop that controls oscillation period.

A novel form of self oscillating vortex nozzle having potential application in a fountain system according to the first aspect of the present invention comprises a cylindrical vortex chamber having a central output nozzle and an input comprising a section of the cylindrical wall of the chamber to which an input chamber is connected, a narrowing of the input chamber being provided at the input section of the vortex chamber, whereby flow entering the vortex chamber oscillates between swirling entry and straight radial entry leading to oscillations in the out put between a straight jet and a swirling spray.

Windy conditions adversely affect the appearance of fountains, and frequently causes loss of water from a surrounding pool, which might be problematic in respect both of the loss of water from the pond or pool, as well as wetting surrounding areas.

Consequently, in its first aspect, the invention also provides a wind detection and adjustment device comprising a catcher for water issuing from a detecting jet and falling under no-wind conditions, and a wind control diverter having a supply input, first and second wind control outputs diverging from said supply input, two wind control ports to direct supply input flow to one or other of said outputs, wherein water caught by the catcher is supplied to one control port to direct supply input flow to said first wind control output, the other control port being supplied from a feedback loop from said first wind control output that switches supply input flow to said second wind control output when no water flows from said catcher.

Preferably, said first wind control output is connected to the radial port of a fountain supply vortex amplifier to provide a strong flow therethrough, and said second wind control output is connected to a tangential port of a vortex amplifier to provide a weak flow therethrough, output from the fountain supply vortex amplifier supplying the fountain display.

Indeed, from a second aspect, the present invention provides a wind detection device comprising a catcher for liquid issuing from a detecting jet and falling under no-wind conditions, an outflow from the catcher, and means to detect liquid in the catcher.

Said means to detect may comprise a pressure sensor sensitive to hydrostatic pressure of liquid in the catcher. Alternatively, said means to detect may comprise a flow detector sensitive to outflow of liquid from the catcher.

Inherent in such a detection device is that, in high-wind conditions less liquid falls into the catcher, so the outflow from it, or the hydrostatic pressure in it, is less than in no-wind conditions. Ultimately, in high-wind conditions, outflow from the catcher leads to both the hydrostatic pressure and outflow reducing to zero. Whether this occurs very rapidly, so that the detector is sensitive to gusts, or slowly, so that the detector is sensitive only to sustained high-wind, is a matter of design choice. Indeed, there is no reason why the pressure or outflow detectors should not be sensitive enough to detect gradations of wind.

The wind detector is most suitable where there is already a source of liquid under pressure, such as in fountain displays. In this event, and others, the liquid is preferably water. The detecting jet is preferably vertical, although it may be pointed in any direction provided the catcher is positioned to receive the detecting jet in no-wind conditions. The jet may be vertically down. The wind detector may be employed with a fountain display according to the first aspect of the present invention, but equally it could be employed with more conventional display fountains employing electrical/mechanical controls. Thus the flow/pressure detectors may be non-fluidic.

Preferably, manual control of a fountain display in accordance with the first aspect of the present invention is provided, comprising a manual diverter having a manual input, first and second manual outputs diverging from said manual input, first and second manual control ports to direct said input flow to one or other of said outputs, wherein each control port is supplied by a branch from said manual supply, each branch being controlled by a first restrictor and at least the first control port branch having a second restrictor, a selectively blockable vent being provided between said first and second restrictor whereby, when said vent is blocked, said restrictors are such that control flow is primarily through said first manual control port and, when said vent is not blocked, control flow is primarily through said second port.

Both branches may have a second restrictor, and both having a selectively blockable vent between said first and second restrictors in each case.

A pilot diverter may be provided, comprising a pilot flow input, first and second pilot outputs diverging from said pilot input, two pilot control ports provided with control flow to direct pilot input flow to one or other of said pilot outputs, which pilot outputs comprise the control ports of said primary diverter.

Multiple logic diverters may be connected in a logic circuit wherein each diverter has a logic flow input, first and second logic outputs diverging from said logic input, two logic control ports provided with control flow to direct logic input flow to one or other of said logic outputs, which logic outputs comprise the control ports of any other logic diverter, any pilot diverter or said primary diverter.

Said pilot diverter may be in the form of a logic module receiving a plurality of inputs from different sources whereby the direction of switching of said primary diverter may be dependent on a plurality of factors controlled by said logic module.

A fountain display in accordance with the first aspect of the present invention may comprise a plurality of diverters, some providing alternating jets directly, and others feeding vortex amplifiers providing alternating jets and sprays, each diverter being controlled by said logic module having a number of inputs, one of said inputs being connected to one output of a neighbouring diverter, and another of said inputs being connected to the other output of said neighbouring diverter or to one output of a different neighbouring diverter.

A neighbouring diverter for a diverter on one side of the fountain display may comprise a diverter on the opposite side of the display, whereby the display is topologically on the surface of a sphere.

Said diverters may be arranged in a square formation and each diverter may have eight neighbours, said logic module having four inputs on one side and four on the other.

However, in a third aspect of the present invention, there is provided a fountain display, comprising at least two display elements, each element being driven by at least one output of a diverter directly associated with each element and controlled by a logic module, each diverter comprising an input for a supply of liquid, and first and second outputs diverging from said input, and at least one control port selectively provided with control flow to direct input flow to one or other of said outputs, and each logic module having at least two inputs and at least one output connected to the control port of the diverter to provide said control port with said selective control flow, and wherein at least one output of the diverter of one element is connected to one input of the logic module of another element.

Preferably, each element has two modes of operation, one mode driven by one output of said associated diverter and the other mode being driven by the other output of said associated diverter, said connection to said input of the logic module of said another element being a branch of one of said outputs of said associated diverter.

Said logic module may comprise multiple logic diverters in a logic circuit, wherein each logic diverter has a logic flow input, first and second logic outputs diverging from said logic input, two logic control ports provided with control flow to direct logic input flow to one or other of said logic outputs, which logic outputs supplies the control ports of any other logic diverter, or the, or one, output of the logic module.

The display elements may be in a formation in which each element is surrounded by N neighbouring ones of said elements and in which each logic module has N inputs, one from said branch of each neighbour. The formation might be square, and N might be eight. Indeed, the number N of neighbours and inputs may be the same for each element, the display being arranged as a topological sphere.

In one embodiment, the display arranged to emulate a cellular automaton demonstrating the "Life" process of J H Conway. In another, it is arranged to emulate a cellular automaton demonstrating the "rule 30" algorithm of S Wolfram.

In a different aspect, the present invention also provides A fountain comprising: a supply of water under pressure; a fluidic diverter having an input for said supply, first and second outputs diverging from said input, and two control ports provided with control flow to direct input flow to one or other of said outputs; a control loop interconnecting said control ports to cause oscillation of said direction of the input flow; and a tapping in said control loop, whereby said control loop may be supplied with water and/or drained of water to control the frequency of said oscillation.

Preferably, said tapping is a first tapping connected to said supply, a second bleed tapping being provided in the control loop between said first tapping and one control port, whereby said first tapping admits flow into the control loop, said second tapping drains flow from said control loop, whereby switching of the diverter may be controlled by restricting said drainage. Restrictors may be provided around said second tapping to adjust relative flow in the control loop on either side of the second tapping, and into the bleed.

The diverter may be arranged to be monostable to one of said output ports, temporary blocking or unblocking of said bleed tapping serving to switch flow to the other of said output ports.

BRIEF DESCRIPTION OF THE DRAWINGS

Embodiments of the invention are further described hereinafter, by way of example, with reference to the accompanying drawings, in which:—

FIGS. 3a to d are a side section, section on the line 1-1 in FIG. 3a, section on the line 2-2 in FIG. 3a, and a perspective view of a vortex valve useful in the performance of the present invention;

FIGS. 4a,b and c are side sections through nozzle arrangements useful with the vortex valve in FIG. 3;

FIGS. 5a,b and c are side views of adaptations of the nozzles in FIG. 4 and provided with swirl catchers.

FIGS. 6a to g are side section and perspective views of different nozzle arrangements;

FIGS. 7a to d show variations of the vortex valve of FIG. 3, in side section, cross section, modified, partial cross section and modified cross section, respectively;

DETAILED DESCRIPTION

Figure 1A:
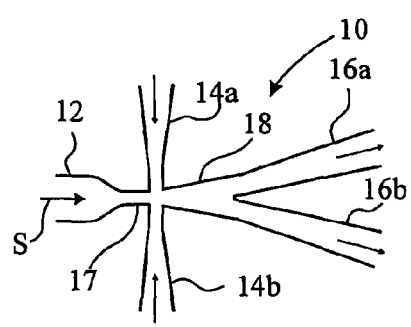
FIGS. 1a to f are schematic illustrations of diverters useful in the practice of the present invention.

FIG. 1a shows an unvented bistable fluid amplifier (fluidic diverter 10), comprising a supply input 12, two control ports 14a,b, and two outputs 16a,b. The supply flow is formed into a jet 17, which attaches to either the top or the bottom of a diverging section 18 of the diverter 10. Accordingly, the supply flow through the jet 17 will exit one or other of the outputs 16a,b. All of the supply flow can be switched to either output (100% diversion) if brief control flows are imposed on the control ports 14a,b. If the outputs are unrestricted, flow can be entrained from the inactive output, so that the outflow appears to be greater than the supply flow ("more than 100% flow diversion). The control flow needed to switch the diverter 10 depends on the output restriction. Increasing restriction (thereby reducing the percentage flow diversion) reduces the flow needed to switch the diverter (that is to say, the restriction increases the "gain", but reduces the "stability").

Figure 1B:
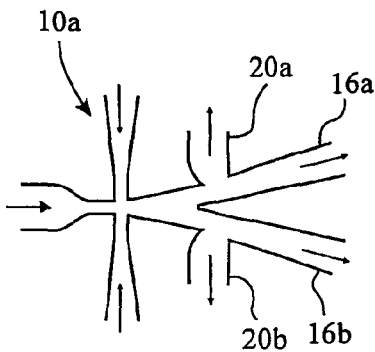

In FIG. 1b, vents 20a,b are shown in modified diverter 10a. The vents 20a decouple the outputs 16a,b, from one another so that there is no flow entrainment. Moreover, the amplifier 10a acts as a logic element (flip-flop or memory device). It can be connected easily to other similar elements to transmit signals, because the vents 20a,b isolate operation of each device in the overall circuit.

Figure 1C:
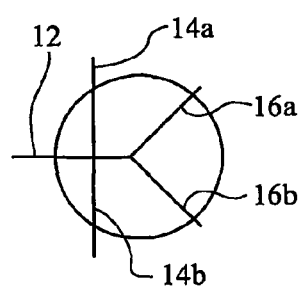

FIG. 1c shows the symbol employed herein in circuit arrangements. The reference numerals are the same as those employed in FIG. 1a. Indeed, the same reference numerals are applied throughout this specification to refer to essentially the same components, sometimes modified with subscripts or superscripts to indicate modifications or different examples of the same unit.

Figure 1D:
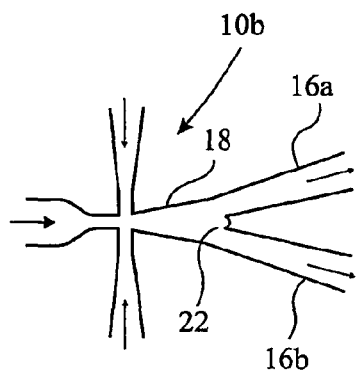

FIG. 1d shows a further diverter 10b, having a cusped splitter 22 between the two outputs 16a,b. The twin cusps 22 promote a re-circulation zone and provide a highly stable flow field. This is because, even should the active outlet 16a or b be blocked, a re-circulating flow can remain attached to the adjacent side wall of the diverging section 18. When the block is removed, flow continues down the same branch.

Figure 1E:
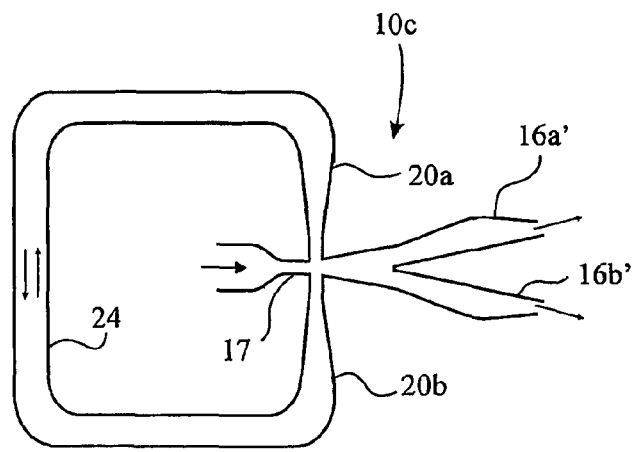

GB-A-1297154 and 1363762 both disclose the use of a fluidic diverter to provide oscillating flow. This is done by interconnecting the control ports of the diverter, as illustrated in FIG. 1e, where the control ports 20a,b are interconnected by a hose 24. The diverter must be suitably designed (ie not a high stability type) and the outputs must be restricted, as shown at 16'a,b). Sufficient restriction should be made of the outputs 16'a,b to ensure 100% flow diversion. The frequency of oscillation is determined by the inertia of the flow through the control loop 24, and the pressure difference induced between the control ports by the main flow jet 17. Increasing flow increases the pressure differential and the result is that frequency is closely proportional to the flow. Importantly, the time constant can be set by inertia and resistance (without the need for compliance—ie elasticity). Consequently, an incompressible fluid, such as water, can fill the control loop 24 and produce a reliable dynamic response. In general, the longer the control loop 24 is, the lower the frequency of oscillation will be. On the other hand, the control loop 24 cannot be so long that its resistance prevents the necessary flow to build-up and switch the diverter 10c.

It is important to expel all air in the control loop 24, and one way of doing this is to provide a bleed tap (not shown) near the middle of the control loop 24. This works provided that the pressure in the control loop is greater than atmospheric. If the pressure is lower, then a small water feed into the control loop to purge the loop of air may be required.

Figure 1F:
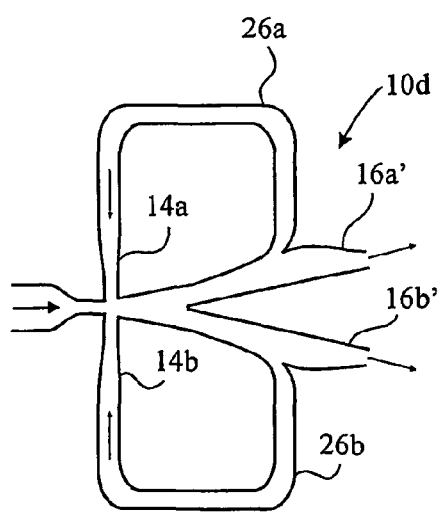

FIG. 1f shows a diverter 10d in which restricted outputs 16'a,b are provided with branches 26a,b that are fed back into the control ports 14a,b. The restrictions of the outputs ensure a strong feedback signal. These set the frequency by way of a predominantly inertial time constant (like the control loop 24 mentioned above). However, if compliance is introduced into the feedback path, this influences the time constant. Indeed, increasing elasticity (or increasing inertance) decreases the frequency. If elasticity is minimized, the inertial time constant is dominant and, like the control loop oscillator $10c$, the frequency is closely proportional to the flow.

Figure 2A:
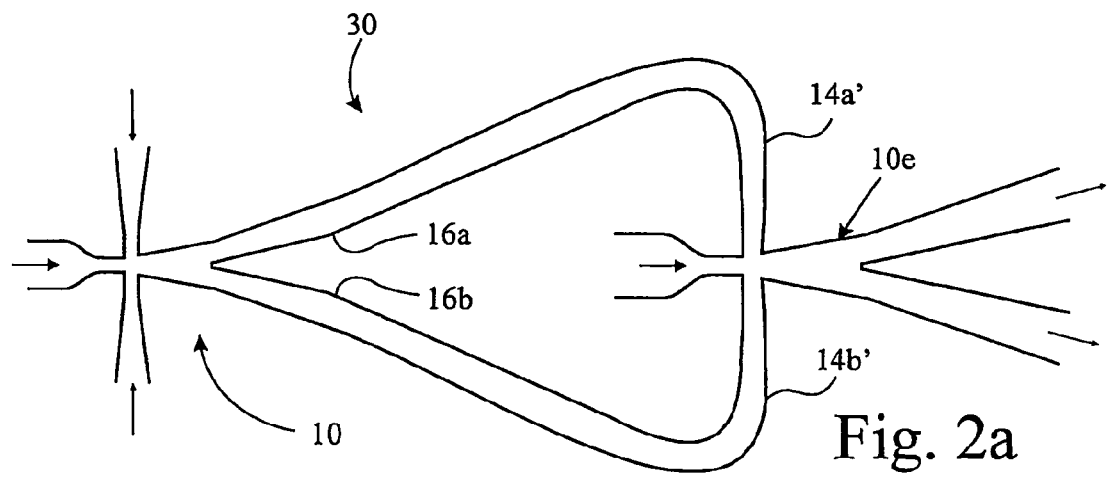
FIGS. 2a to d are a schematic illustration of a diverter controlled by a pilot diverter, its symbolic representation, a circuit involving two such diverters, and a multi-stage register, respectively.
Figure 2B:
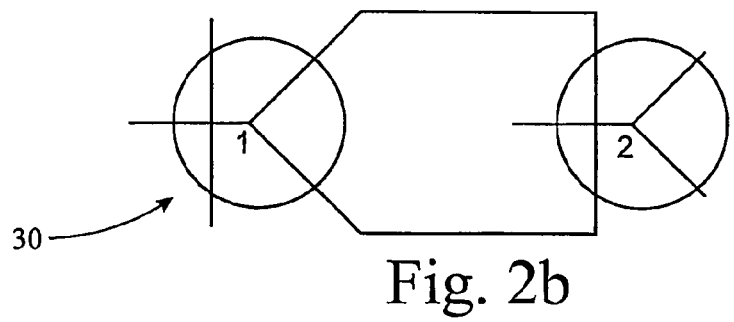

In FIG. 2a, a two stage fluidic bistable amplifier 30 is shown. Here, a first diverter 10 corresponds with any of the diverters discussed above with reference to FIGS. 1a to f. However, its outputs 16a,b form the 20 control ports 14'a,b of a second diverter 10e. This is shown in symbol form in FIG. 2b. Such an arrangement can provide both pressure and flow gain. Typically, diverter 10e is bigger than diverter 10, especially if the diverters are unvented devices.

Figure 2C:
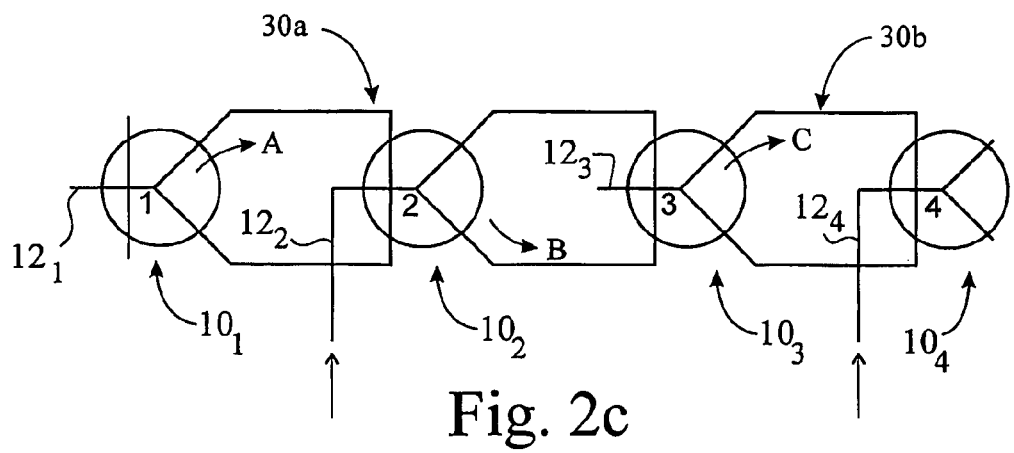

Various logical functions can be produced by simple chains of bistable amplifiers. Four amplifiers can be used as two stages of a shift register. See, for example, FIG. 2c. Here, two-stage amplifiers 30a,b are connected in series, each serving as memory elements containing one bit of information each. Amplifiers $10_1$ and $10_3$ are memory elements containing one bit of information each, whereas amplifiers $10_2$ and $10_4$ act as control gates. If the supply flow to the control gate is zero, there is no transmission of the state of amplifier $10_1$ to amplifier $10_3$. However, when a "shift signal" is fed to gates $10_2$ or $_4$ the state of flow through the preceding amplifier $10_1$ or $_3$ is transmitted to the next element in turn (ie diverter $10_3$ or beyond diverter $10_4$).

Thus, if the supply flow to diverter $10_1$ is presently directed to the upper output (ie in the direction of the arrow A) then, when a shift signal is sent to supply $12_2$ of diverter $10_2$, its output will be switched by the A output of diverter $10_1$. It will be switched into an output in the direction of the arrow B from diverter $10_2$. This will serve in turn to switch the supply entering diverter $10_3$ from its input $12_3$ to the direction C, which it will then maintain even if the shift signal $12_2$ into diverter $10_2$ should subsequently cease. Likewise, the preceding state of diverter $10_3$ would be passed on to subsequent elements of the logic circuit by the diverter $10_4$.

In a chain of more than two or three amplifiers, the flow gain may be substantial. In that event, some of the amplifiers would typically be vented devices.

Such chains of amplifiers can be controlled in various ways. For example, the gating signals to the control amplifiers $10_2$, $10_4$ can be activated in anti-phase (ie one on and the other off) thereby giving very tight control of the progress of signals through the chain. The same surety can also be achieved by restricting the signal strength transmitted from the memory amplifiers $10_1$, $10_3$. Signals can only transmit when the gate amplifiers accept the weak signal, and then boost it to control the next amplifier. This onward transmission only occurs when the gate amplifiers have a high supply flow, but they are then immune from the weak signals coming from the preceding memory amplifiers. Hence a shift register can be made using two amplifiers per stage.

Figure 2D:
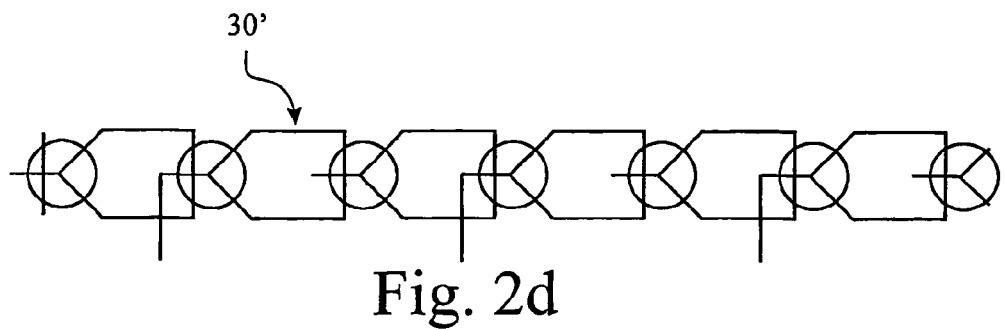

Various sequences of signals can be generated by feeding back signals from the output to the input of a shift register. By feeding back simple logic functions (for example exclusive-or) so called maximum length sequences can be generated (meaning the maximum possible length of bit sequence before repetition from the given number of memory elements in the shift register). Hence, complicated sequences of events can be controlled. FIG. 2d shows a multi-stage fluidic shift register 30'.

Turning to FIGS. 3a to d, a vortex valve 40 is shown having a supply flow input 42 and a control flow input 43. The input 42 is received in a housing 44, it being sealed thereto by an end cap 46. Inside the housing 44, the supply input is perforated with regularly spaced holes 48 (spaced both axially and circumferentially) so that the flow enters an annular duct 50 formed between the input pipe 42 and the housing 44. The input pipe 42 is sealed at its end by a centre body 52 that defines one side of a vortex chamber 54. The other end of the vortex chamber is closed by a nozzle plate 56 having a central nozzle 58.

The control flow input pipe 43 is connected to the nozzle plate 56 and is terminated by a tangential port 60 that connects the pipe 43 with the vortex chamber 54.

In the absence flow in the control pipe 43, flow in the pipe 42 exits through the holes 48 and flows along the annular duct 50 and enters the vortex chamber 52 in a radial direction from around the entire circumference of the centre body 52. Accordingly, there is no circumferential component of the flow. It is entirely radial, as shown by the arrows in FIGS. 3a and c. Accordingly, the output from nozzle 58 may be a coherent, non-swirling jet that will exit the nozzle 58 as a clean column of liquid, with no spray or break-up.

However, if there is no supply flow 42, but only flow in the control pipe 43, then the vortex chamber 54 is filled by supply through the tangential port 60. So that there is a swirling flow in the vortex chamber 54 as shown by the arrows in FIG. 3b. In this event, the flow out of the nozzle 58 has substantial swirl and exits nozzle 58 as a coned spray. The cone angle is dependent on the geometry of the nozzle and the degree of swirl in the vortex chamber 54.

Accordingly, depending on whether flow to the vortex valve 40 is through the supply input 42 or the control input 43, the exit from the nozzle 58 is either as a coherent jet or as a fine coned spray.

Figure 8A:
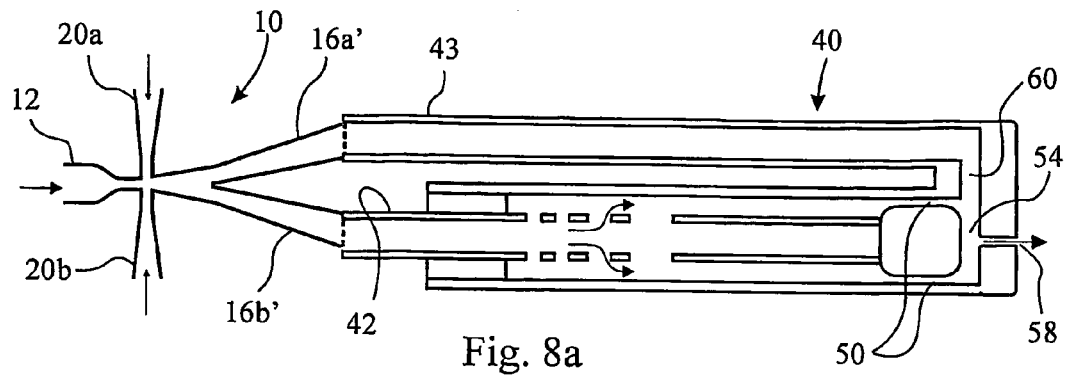
FIGS. 8a,b and c show side section through a diverter of FIG. 1 (in fact FIG. 1a) combined with the vortex valve of FIG. 3 (a fountain element in accordance with the present invention), in section in FIG. 8a, in perspective view in FIG. 8b and symbolically in FIG. 8c.
Figure 8B:
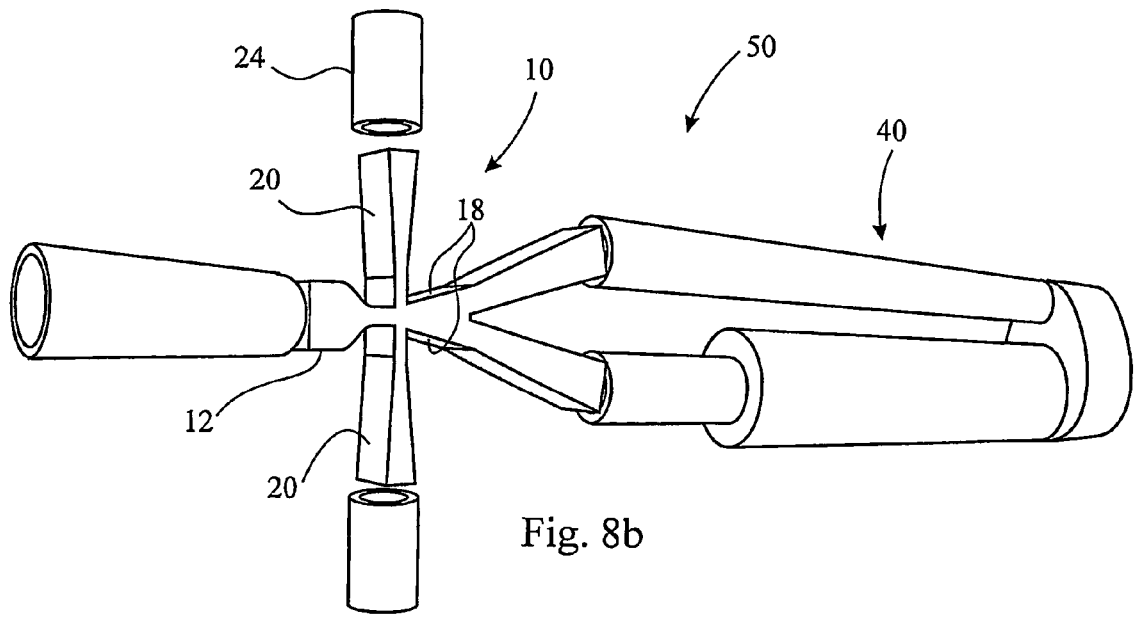
Figure 8C:
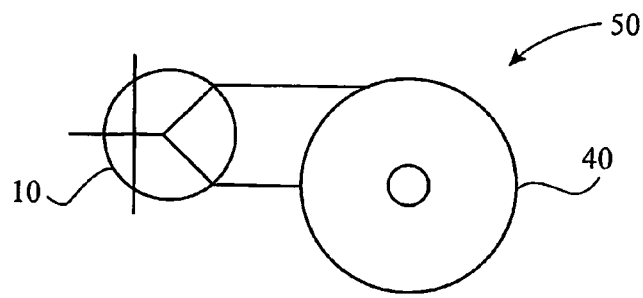

Referring to FIGS. 8a to c, the vortex valve 40 is shown there used in conjunction with a diverter 10 to form a basic fountain 50 in accordance with the present invention. In its simplest form, the fountain 50 comprises a diverter 10 as described above with reference to FIG. 1e. That is to say, one in which the control inputs 20a,b are interconnected by a control loop (not shown in FIG. 8a). In this event, the flows to the respective outputs 16'a,b simply oscillate, so that flows to the inputs 42,43 of the vortex valve 40 alternate with respect to one another. Thus, the output from the outlet nozzle 58 oscillates between a straight jet and a coned spray.

In FIG. 8b, it can be seen that diverter 10 has a rectilinear cross-section. This favours effective switching between the respective outputs, both by virtue of the control inputs 20 being across the entire section of the supply 12, as well as the jet flow having greater surface of the diverging walls 18 over which to attach thereto. However, in a practical embodiment, there is likely to be a smooth transition between the round supply, control and delivery tubes connected to the diverter 10, and the rectilinear sections of the diverter itself. The symbol for the switched vortex valve 50 is shown in FIG. 8c.

Returning to FIGS. 4a to c, a nozzle plate 56a is shown in FIG. 4a. A nozzle body 57 can be screwed into a threaded aperture 55 of the nozzle plate 56a. The nozzle body 47 has the nozzle aperture 58 and this can be shaped to provide the desired jet. Where the two forms of jet are a swirling conical flow sheet, or a coherent jet, these are most readily accommodated by a smoothly chamfered inlet 59 of the nozzle 58 and a sharp exit 61. In FIG. 4b and c, a nozzle body 57' is here held in place by a threaded retaining ring 63 screwed onto a modified nozzle plate 56b, which is provided with an O ring seal 67.

Turning to FIG. 5a, one embodiment of retaining ring 63' is shown having a pin 69 projecting therefrom and to which a swirl deflector disc 71 is connectable. Disc 71 is provided with a central aperture 73 through which jet flow from nozzle 58 can pass unimpeded. However, when a diverging coned sheet flow (suggested by arrow 75 in the drawings) emanates from the nozzle 58, it is deflected by the disc 71 and evolves more as a horizontal spray, even more distinct from the jet than the coned spray. Alternatively, an entirely spray destructive shroud 71' can be connected to the pin 69. The shroud 71 entirely contains and destroys the conical spray 75 so that the output from the nozzle 58 appears only to comprise a pulsating jet. If that is very coherent, its appearance is very appealing, emphasizing the motion of the water in an arcing flow.

FIG. 5c shows how the disc catcher 71 may be implemented with a screw in nozzle 57'. Here, a disc 72 is formed integrally with the nozzle body 57' and to which the pin 69 is connected. To the pin 69, deflector disc 71 or shroud 71' can be connected as desired.

Referring to FIG. 6, various forms of nozzle plates 57' are shown.

FIG. 6a shows a basic nozzle 58 that gives a conical spray and a good coherent jet. In FIG. 6b, nozzle 58b has a chamfered exit so that a flat or very wide spray is delivered. However, it is more difficult for the jet to remain coherent, so that any swirl is more likely with this arrangement to lead to break-up of the jet. In FIG. 6c, the nozzle 58c is in the form of a flat slit across the face of the nozzle plate 57'. This results in a flat, triangular sheet-jet. In FIG. 6d, a stepped bore nozzle 58d provides a very tight spray and a good jet. FIG. 6e shows a multi-jet nozzle 58e. FIGS. 6f and g show a modified nozzle plate 57" that is provided with a threaded bore 55' to receive screw-in nozzle bodies 58 similar to those described above with reference to FIG. 4a.

Turning to FIG. 7a to d, a modified vortex valve 40' is shown in which the control pipe 43' now surrounds the housing 44 and has a number of tangential control ports 60'. However, to direct the flow tangentially, the wall of the housing 44 has to have a substantial thickness, so that a tangential flow direction can be provided by the ports 60'. Alternatively, vanes 75 may be disposed across the wall 44, so that flow from the annular control duct 43' into the vortex chamber 54 is caused to swirl by those vanes 75 on passing through the openings 60'. Also, as shown in FIG. 7c, straightening vanes 77 can be provided on the centre body 52 so that flow through the supply pipe 42 can be maintained absolutely axial.

Figure 9A:
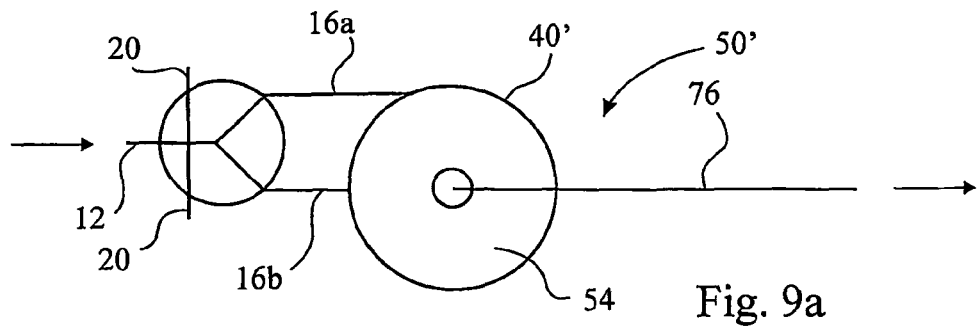
FIGS. 9a to 9c show various ways of employing the arrangements of FIG. 8, but as a control valve rather than a direct fountain spray element.

Referring to FIGS. 9a to g, various combinations of the foregoing components are illustrated. In FIG. 9a, the switched vortex valve 50' is shown delivering an output outflow on line 76 that is led to another device or system. The effect of the diverter 10/vortex valve 40' combination is that the supply flow 12 is modulated at the output 76 by the control flows 20. When the vortex valve 40' is supplied by output 16b of the diverter 10, then no vortex swirl is produced in the vortex chamber 54 of the vortex valve 40'. Therefore, a high flow rate is seen at the output 76. On the other hand, if the output of the diverter 10 is through line 16a, then this enters the vortex valve 40' tangentially. This causes a vortex in the chamber 54 and so increases the resistance of the valve to flow. A relatively small output flow is then seen at the outlet 76.

Figure 9B:
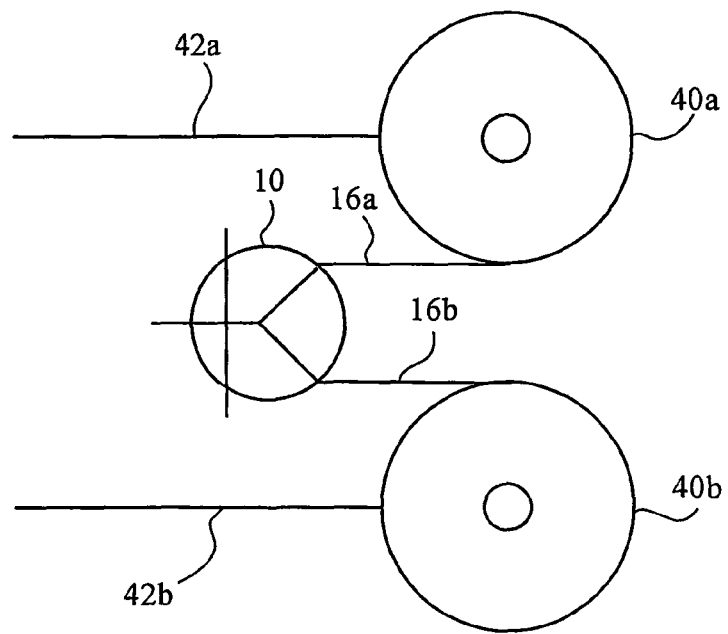
Figure 9C:
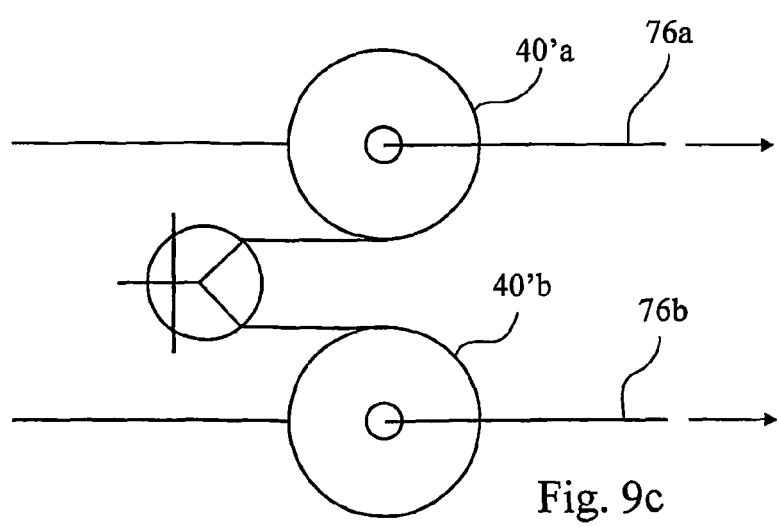

In FIG. 9b, a diverter 10 is shown with its outputs 16a,b connected to two vortex valves 40a,b. Each vortex valve has its own radial supply 42a,b so that, depending on the switched state of diverter 10, vortex valves 40a,b will alternate between respective jet flow and spray flow. In FIG. 9c, the arrangement is as in FIG. 9b except that the vortex valve 40'a,b are as shown in FIG. 9a, and are used to provide flow for another device or system from their outputs 76a,b.

Figure 9D:
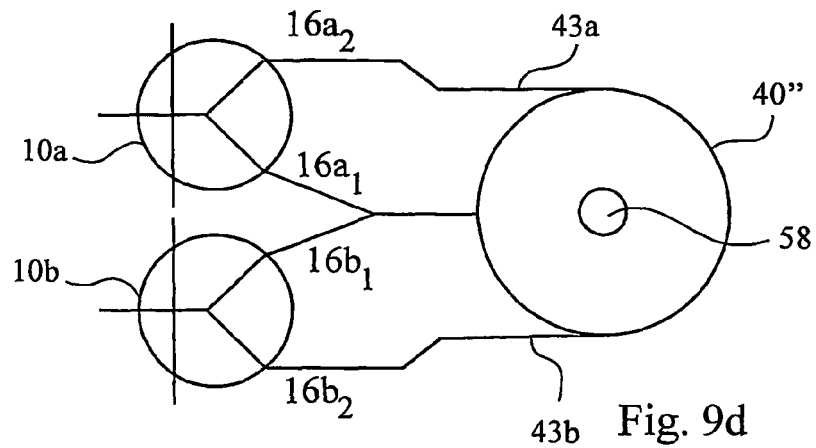
FIGS. 9d to 9g show how various spray effects are achieved from arrangements of diverters and vortex valves.

In FIG. 9d, two diverters 10a,b are used to control a single vortex valve 40" having opposed control flow inputs 43a,b. This provides for potential modes of operation depending on the four possible combinations of the outputs from diverters 10a,b. Indeed, the four output states of the flow from nozzle 58 are described in the Table I above for amplifier B.

Figure 9E:
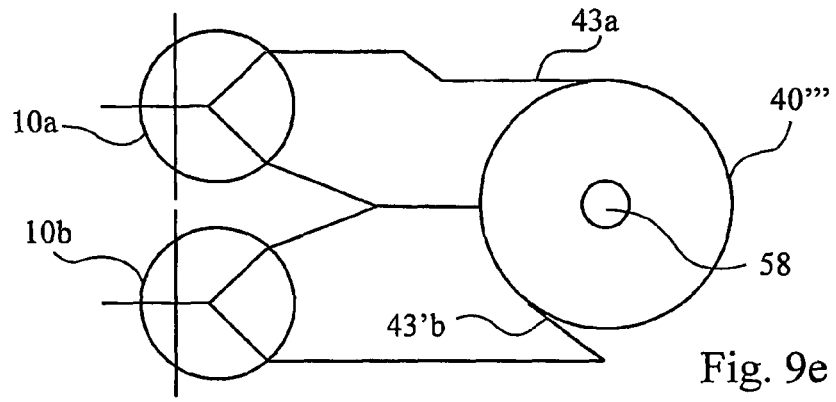

In FIG. 9e, a variation is shown in which the control nozzles 43a, 43'b of vortex valve 40'" are in the same direction. Table I above describes the outflow through the nozzle 58 of the vortex valve 40'" (amplifier A), depending on the states of outputs of the diverters 10a,b.

Figure 9F:
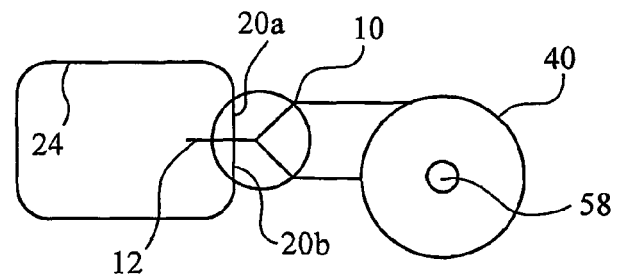
Figure 9G:
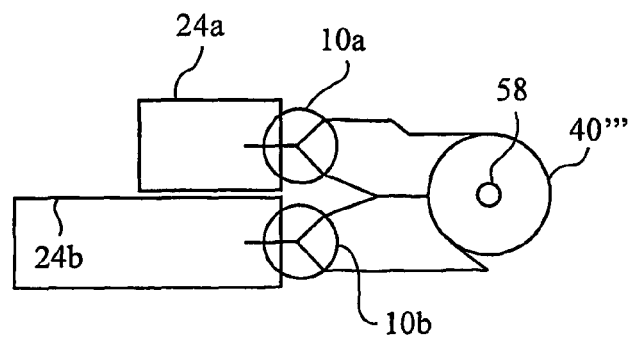

FIG. 9f shows the symbolic representation of the arrangement described with reference to FIG. 1e above in which a control loop 24 is employed to provide oscillatory flow at the control inputs 20a,b of diverter 10. Indeed, the arrangement shown in FIG. 9g is perhaps the simplest embodiment of fountain in accordance with the present invention, in which the input supply 12 is connected to a source of water under pressure (eg mains supply) and the output from the nozzle 58 is either a spray or a single jet. Such an arrangement is simple and inexpensive to manufacture and yet provides an alternating display not presently available so simply.

FIG. 9g shows an arrangement as described above with reference to FIG. 9e, but where control loops 24a,b for the two diverters 10a,b are provided, each of different length. Each diverter switches with a different frequency, therefore, and this results in a somewhat random, or cyclic, appearance to the four output states from the nozzle 58 of the vortex valve 40'".

Figure 10:
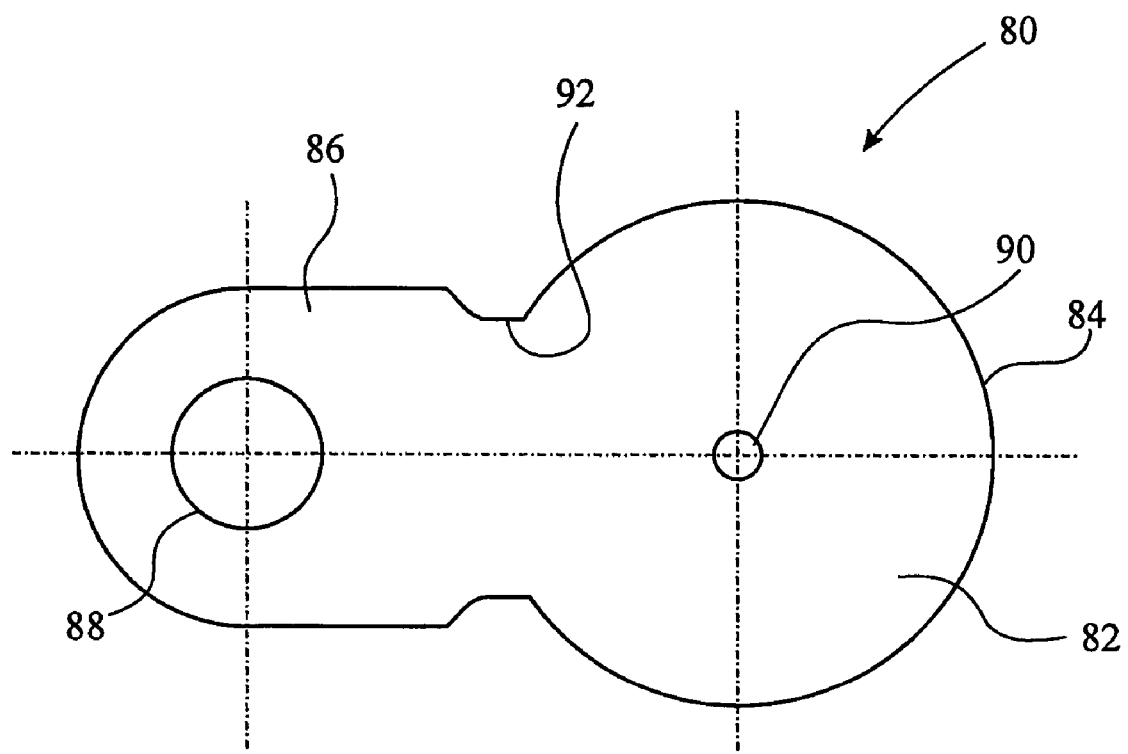
FIG. 10 is a section through a self oscillating nozzle, useful in some embodiments of the present invention.

FIG. 10 illustrates a self-oscillating vortex nozzle 80 comprising flat top and bottom walls 82, a circular vortex chamber 84 and an input chamber 86. The input chamber 86 has a supply port 88 in the wall 82 and the vortex chamber 84 has a central outlet nozzle 90 disposed in the wall 82 that is opposite the wall containing supply port 88. A waist 92 defines the interface between the inlet chamber 86 and the vortex chamber 82. It is found that, in operation, flow into the inlet chamber 86 transitions into the vortex chamber 84 and oscillates between direct flow (that issues from the nozzle 90 as a jet), and swirling flow (resulting in a spray issuing from the nozzle 90). The swirling flow is first clockwise, then anti-clock wise and switches back and forth.

Figure 11:
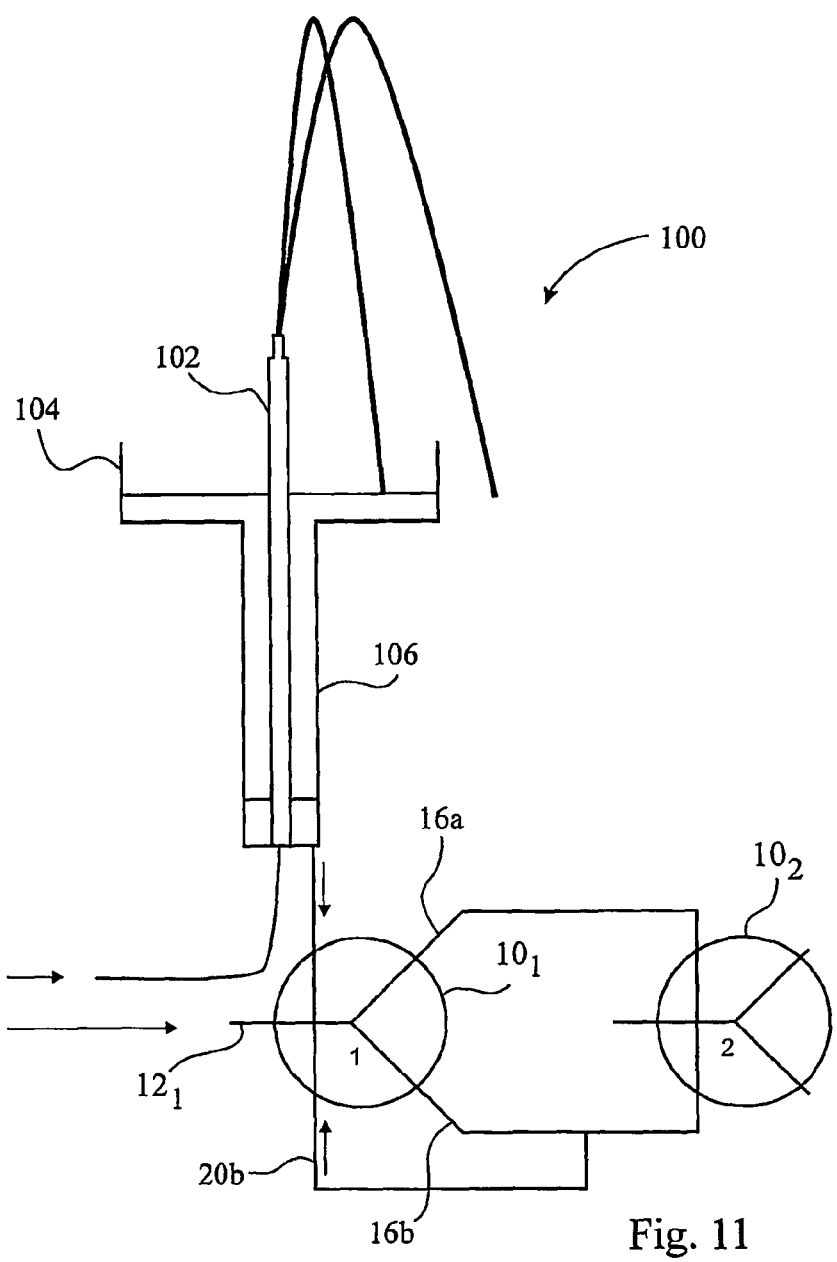
FIG. 11 is a schematic illustration showing a wind detection and adjustment system, useful in a fountain system in accordance with the present invention.

Referring now to FIG. 11, a wind detection system 100 comprises a vertical nozzle and water jet 102 and a surrounding catcher basin 104. The diameter of the basin 104 is designed to be so small that only wind of less velocity than a certain, predetermined velocity will permit the water issuing from the nozzle 102 to be caught by the basin. Wind of any greater velocity will deflect the jet so that it falls beyond the edge of the basin 104. The catcher 104 feeds a vertical columnar collector 106. The wind state is detected by a fluid amplifier $10_1$ having a small supply flow $12_1$. Control input 20a of the amplifier $10_1$ is provided by the collector 106. At low wind speed, the control signal here is strong, and the amplifier is switched to output 16b. Control input 20b is supplied by a feedback bias from output 16b, but the feedback flow is insufficient to overcome the control flow from the wind detector during low wind conditions. However, should a high wind develop so that the catcher 104 empties and no flow comes from the collector 106, the feedback bias from output 16b is sufficient to switch diverter $10_1$. Its output then appears on output 16a. The outputs from diverter $10_1$ are further amplified by a second bistable amplifier $10_2$. More stages could be added to provide control signals to the water supply system, for example, to the fountain system.

Figure 12:
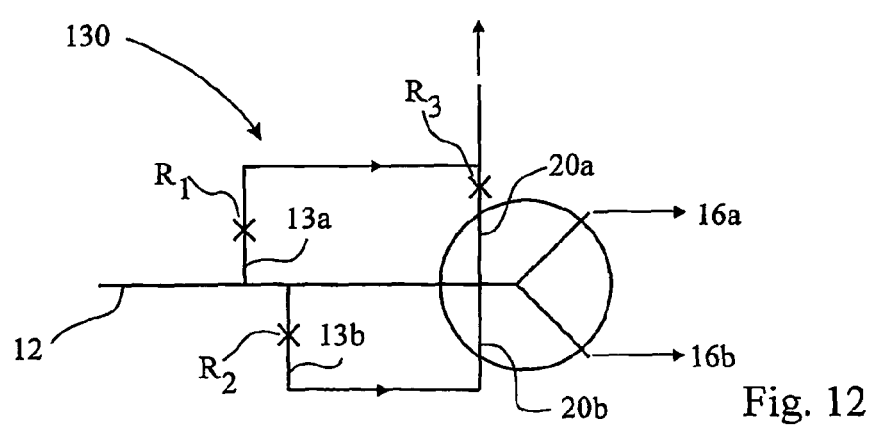
FIG. 12 is a schematic circuit diagram showing a manual control arrangement.

With reference to FIG. 12, a manual control system is provided by a diverter amplifier 10 provided with a supply 12 that has two branches 13a,b that supply control inputs 20a,b of the diverter 10. Both branches 13a,b are controlled by restrictors $R_1$, $R_2$. However branch 13a is provided with a further restrictor R₃, and, between restrictors R₁ and R₃, a selectively blockable vent V is provided. Under normal, unblocked conditions, restrictor R₃ and vent V conspire to ensure that substantially no flow is provided at control 20a. In that event, diverter 10 is switched by the flow through restrictor R₂ and control port 20b so that its supply 12 exits on output 16a. However, restrictors R₁ to R₃ are arranged so that, should vent V be selectively blocked, a more powerful flow is provided by control port 20a, so that diverter 10 is switched to output 16b. Indeed, in this respect, branch 13b provides a reset signal in the absence of activation of branch 13a by blocking vent V. However, an alternative arrangement would be to duplicate branch 13a in branch 13b, whereupon a bistable arrangement would be provided capable of being switched by blocking either of the vents.

Figure 13:
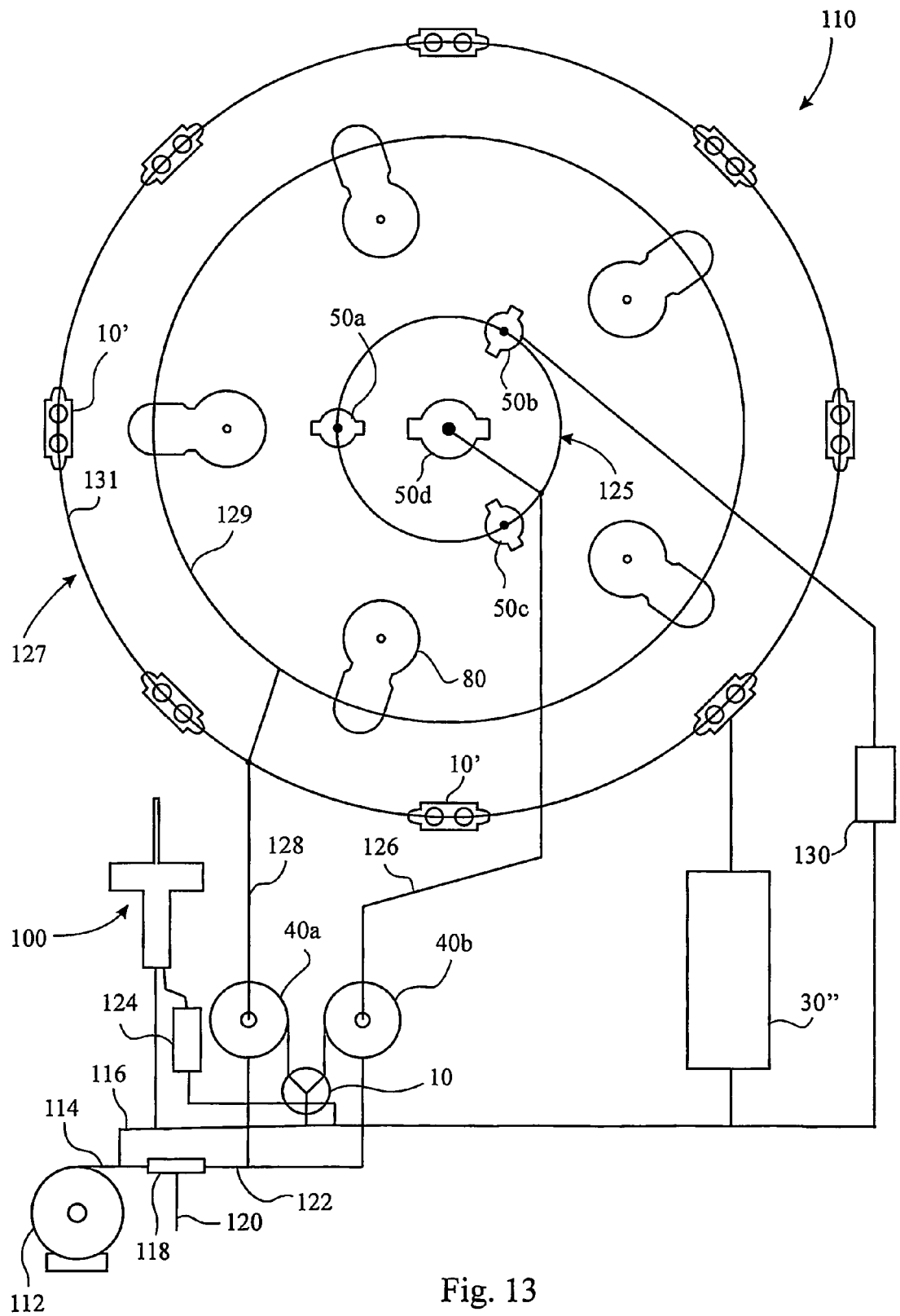
FIG. 13 is plan view of a fountain system in accordance with the present invention employing some of the arrangements illustrated in FIGS. 1 to 12.

FIG. 13 discloses a fountain system 110 embodying the present invention and employing some of the components described above. Here, a main pump 112 supplies water under high pressure. The output 114 immediately branches into a high pressure branch 116 and a branch leading to a jet pump 118 that entrains flow from a source 120 to provide a high flow branch 122. The high flow branch supplies two vortex valves 40a,b in an arrangement as described above with reference to FIG. 9b. The vortex valves are controlled by a diverter 10 which is operated in a mono-stable mode under the control of a wind detector 100, and substantially as described above with reference to FIG. 11. The only modification is that the bias is provided by a branch of the high pressure supply 116. A signal amplifier 124 outputs the signal from the wind detector 100 to the diverter 10.

The arrangement is such that, in low wind conditions, vortex valve 40b is set to high resistance so that the high flow supply in line 122 is impeded and results in a low flow supply in output 126. However, radial flow is permitted through vortex amplifier 40a, so its output 128 is in high flow during low wind conditions.

Output 126 supplies a ring 125 of three fountain devices 50a,b,c and a central fountain 50d, all of which are substantially as described above with reference to FIG. 8. Whereas fountain 50d may be under automatic control by a closed loop, for example (as described above with reference to FIG. 9f) high pressure line 116 may also supply a manual control device 130 (operating substantially as described above with reference to FIG. 12). This is arranged to control the ring of fountains 50a,b,c.

On the other hand, output 128 from the vortex valve 40a supplies two outer rings 127 of devices, an inner ring 129 of oscillating valves 80 (substantially as described above with reference to FIG. 10) and an outer ring 131 of diverter fountains 10'. Here, the diverter outputs 10' are themselves provided with nozzles to deliver alternating jets of water. Again, the high pressure supply 116 is fed to a signal generator 30", which controls the sequencing of the diverter jets 10'. The signal generator 30" may be a sequence generator controlling all the diverters 10' so that they switch in sequence to produce a "Mexican wave". Alternatively they may be switched in phase.

Figure 14A:
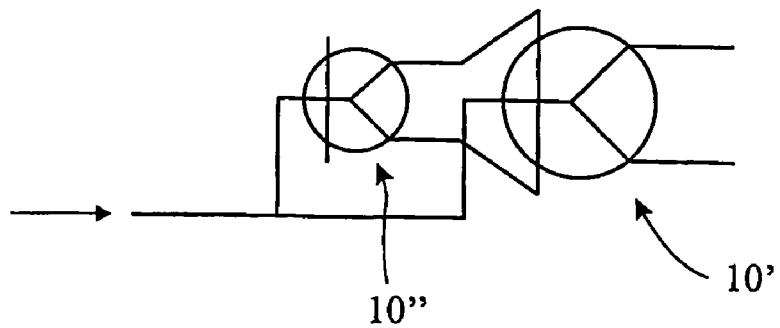
FIG. 14a to c show further circuit control elements useful in fountain systems according to the present invention.

Turning to FIG. 14, the diverters 10' of the ring 131 in the fountain system 110 of FIG. 13, may include an integrated, small pilot amplifier 10'''. This would enable small signal flows sent from the central control unit 30" to switch the diverters 10'.

Using the concept of piloted fluidic display devices, the control sequences could conceivably be implemented by the display devices themselves, if suitable interconnections were made. For example, with an array of N diverters and switched vortex valves, correct interconnection feedback would enable the array to go through a sequence of $2^N$ different combinations of right/left events (diverter fountains 10'), or spray/jet events (diverter vortex amplifier combinations 50) before repetition. In effect, the individual display devices (albeit supported by their pilot stage) would constitute elements of the shift register sequence such as described above with reference to FIGS. 2c and 2d.

Figure 14B:
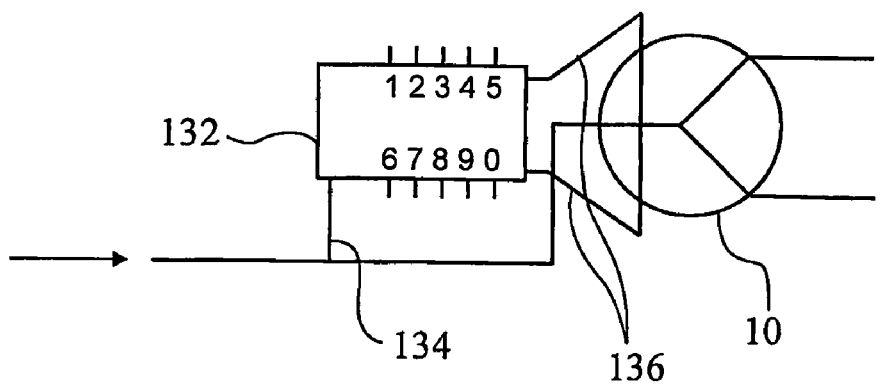
Figure 14C:
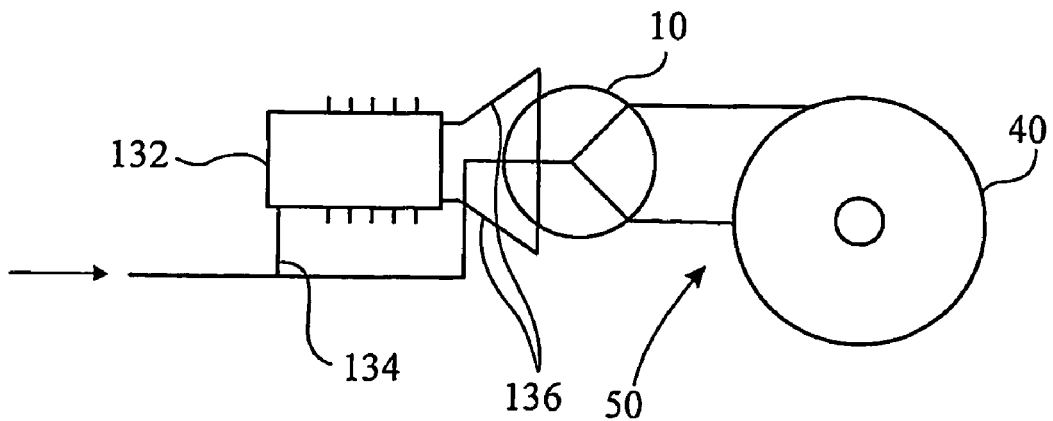

A further advance is shown in FIG. 14b and c, which would be to attach a logic module 132 to a diverter 10. In FIG. 14b, the diverter 10 comprises the fountain element itself. On the other hand, in FIG. 14c, the diverter is part of a switched vortex valve 50. In either event, the logic module has its own supply 134 that appears at one of its outputs 136 forming the control inputs of the diverter 10. Multiple inputs from other sources can be integrated to provide an output on either line 136 depending on which inputs are active.

Figure 15:
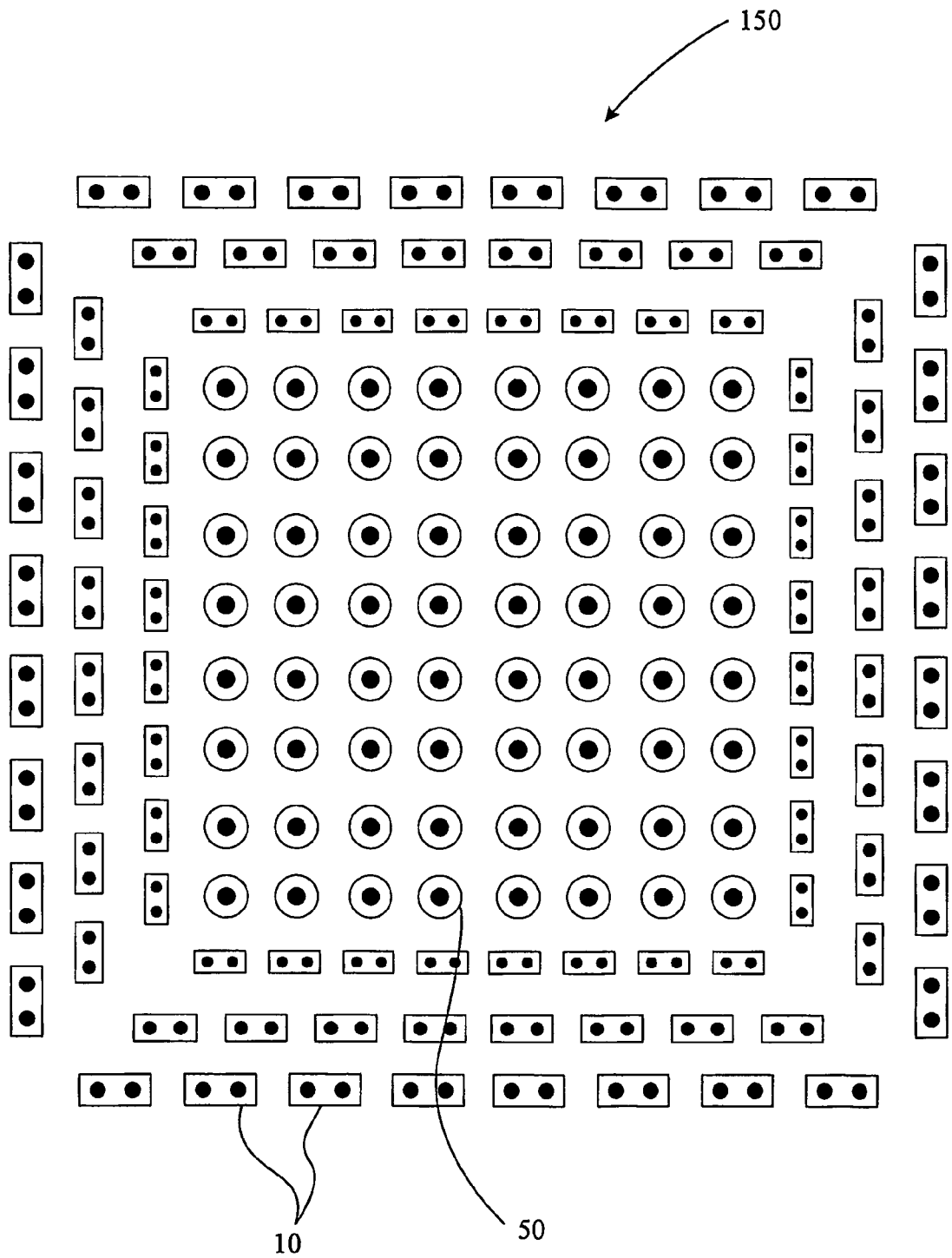
FIG. 15 is a plan view schematically illustrating a fountain system in accordance with a further embodiment of the present invention.

With an arrangement such as this, an array 150 of fountain devices can be internally controlled. In FIG. 15, a central array of switched vortex valves 50 are shown with a surrounding array of diverters 10. Each device is connected by input and output signals to the surrounding eight devices. At the edges of the display 150, signals from one side are transmitted to the opposite edge, so that a topological sphere is provided.

Figure 16:
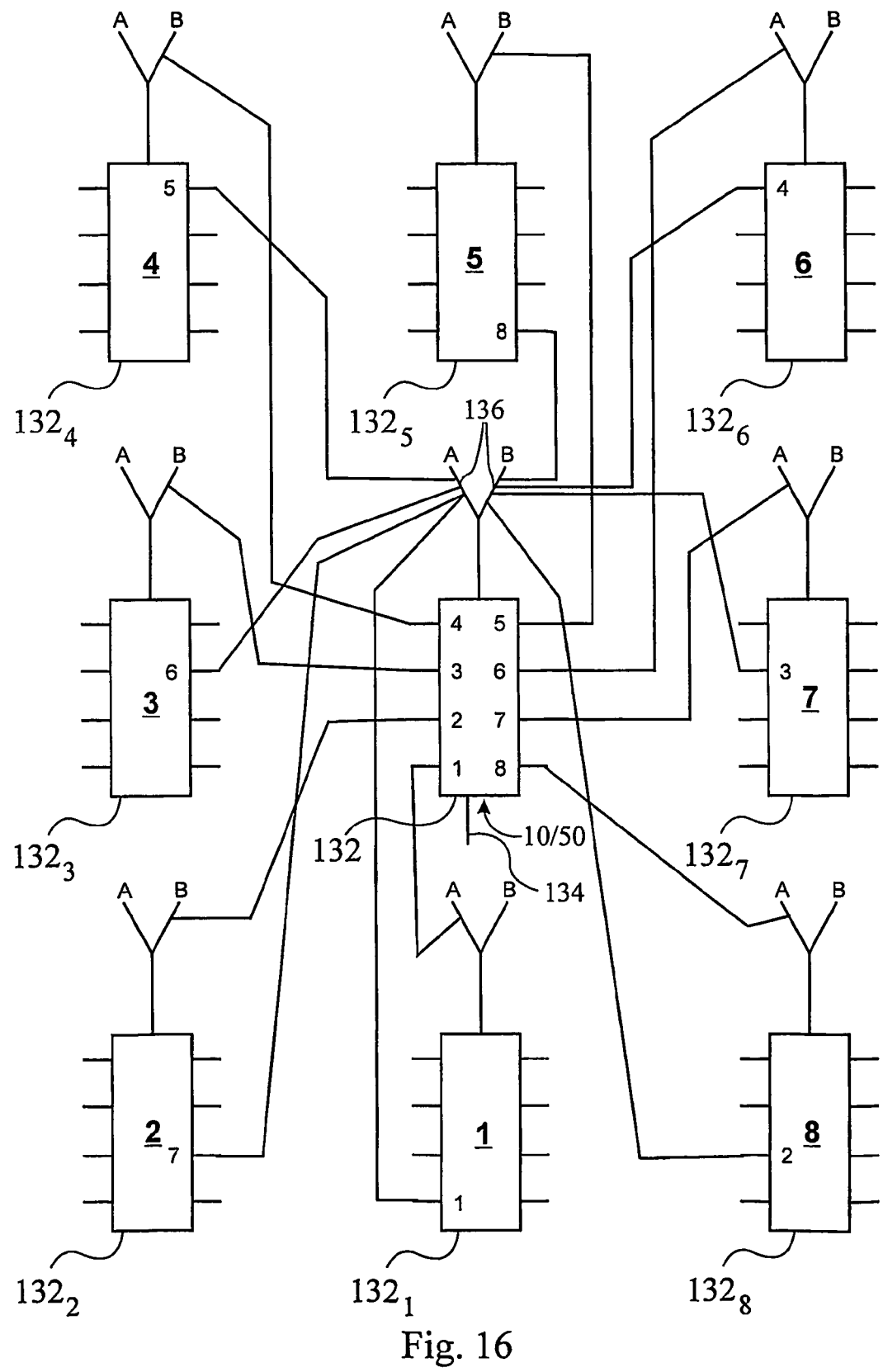
FIG. 16 is a detail of part of the system of FIG. 15.

Turning to FIG. 16, a single fountain element 10/50 is illustrated having eight surrounding elements 1 to 8. Each of the surrounding elements has a diverter output A or B. The A branches of surrounding fountain elements 1, 6, 7 and 8 are connected to inputs 1, 6, 7 and 8 respectively of logic controller 132 of the device 10/50. The remaining surrounding devices 2, 3, 4 and 5 have their B outputs connected to inputs 2 to 5 of logic controller 132. How logic controller 132 is configured is a matter for discretion and design choice, but one possible switching regime is illustrated in Table II below.

TABLE II

| Number of Active Inputs | Current State | Consequent Next Output State |
| --- | --- | --- |
| 1, 2, 4, 5, 6, 7 or 8 | Left | Stay Left |
| 1, 4, 5, 6, 7 or 8 | Right | Switched Left |
| 3 | Left | Switched Right |
| 2 or 3 | Right | Stay Right |

In any event, depending on the logic mode chosen, the output of device 10/50 is to one of its two outputs 136, that is to say, A or B. It is to be noted that the outputs A,B of the device 10/50 each have four branches leading to one each of four of the eight surrounding devices 1 to 8, providing inputs to their logic modules $132_1$ to $132_8$.

When connected in this way, the array emulates a classic cellular automaton ("Life", created by John Horton Conway). As a result, the fountain display 150 could replay any of the well established complex (and sometimes perpetual) sequences. Further possibilities in cellular automata are provided by Stephen Wolfram ("A New Kind of Science" ISBN 1-57955-008-8, Wolfram Media Inc, 2002) who has recently explored and completely characterised many hundreds of millions of binary algorithms. In principle these could be implemented by advanced fluid fountains.

Conceivably, very large arrays of devices could be assembled which would undergo the highly complex "Life" and "Death" phases of cellular automata. The onlooker would see waves, whirls, spasms and inactivities, typical of systems which currently only exist on computer driven video display units.

Figure 17:
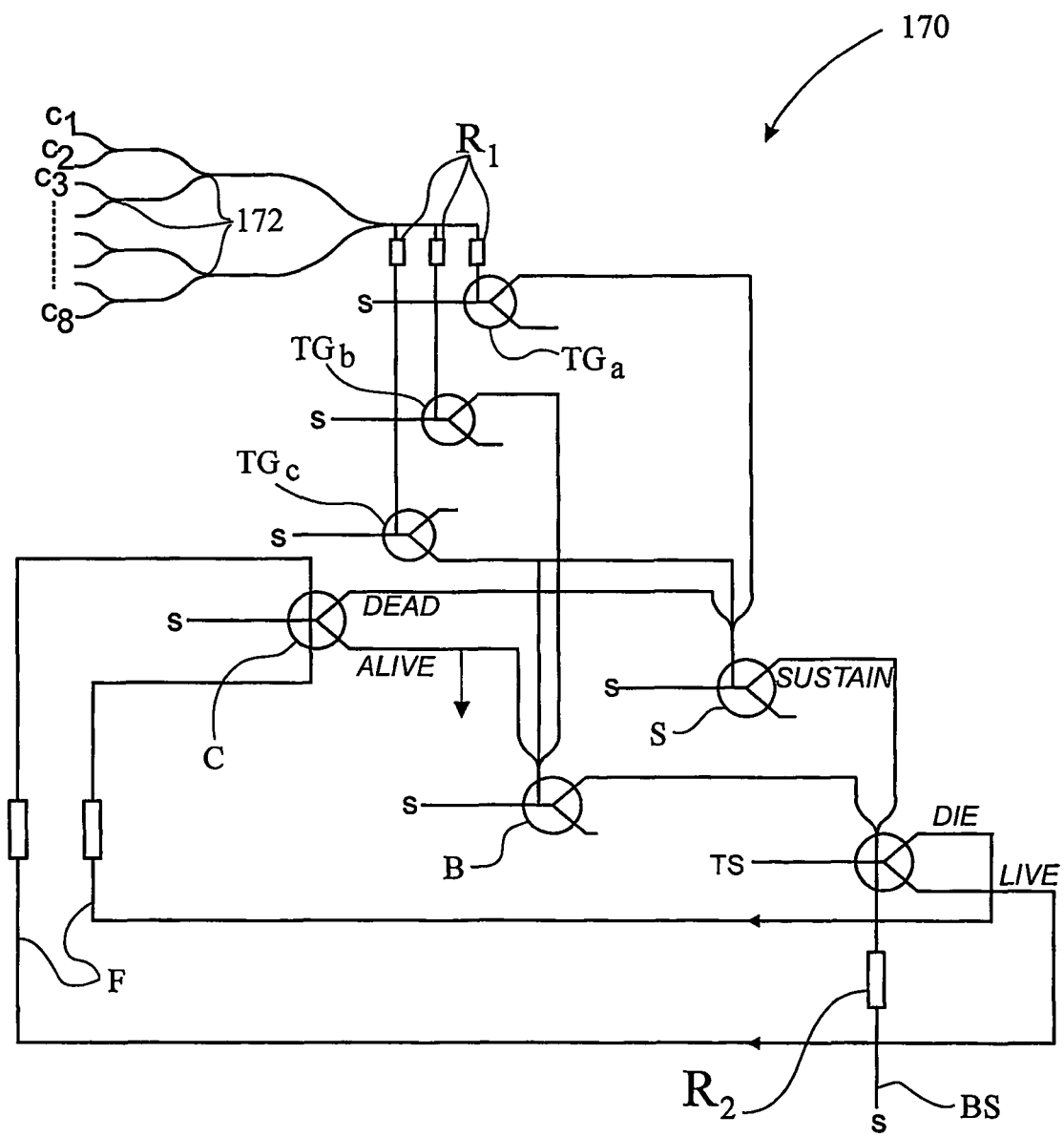
FIG. 17 is a possible fluidic circuit arrangement to give effect to the logic module shown in FIG. 16.

FIG. 17 shows schematically a possible arrangement of a logic control module 170 of the type schematically illustrated as module 10/50 in FIG. 16. This arrangement reproduces the "Life" automaton referred to above. It has eight control inputs $C_1$-$C_8$, each supplied by a neighbour's active output. The inputs are combined in a network of Y-joints 172, which produces a summation of the signals. This summed signal is applied to three monostable threshold gates, TGa, TGb and TGc, through weighting restrictors $R_1$ which set the signal strength that causes each gate to switch. Gate TGa is caused to switch inactive if 2 or more inputs $C_{1-8}$ are active, gate TGb is switched inactive if 3 or more inputs are active, and gate TGc is switched by 4 or more of inputs $C_{1-8}$ being active. Logical processing of the resulting logical functions is then done by fluidic logic devices: two NOR-gates B and S, and two bistable (memory) devices C and N. Bistable N has two control inputs on one side equivalent to an OR function of those inputs. Bistable C holds the current state Alive or Dead of the "cell" represented by the whole circuit. Signals from bistable C are combined with the logical functions from the threshold gates in the NOR gates B & S. NOR gate B generates a signal implying "birth" of a cell from an originally dead state. NOR gate S generates a "sustain" signal which maintains the existing live state of a cell. These signals, which both generate a live state for the next time phase of the automaton, are fed to the next-state bistable N. Bistable N holds the logical state ready for transfer to the "current-state" bistable C via feedback lines F connecting to the input control ports of bistable C. "Death" is produced by a bias signal BS fed from the common fluid power supply S via a restrictor $R_2$; this resets bistable N to the "die" command, unless countermanded by the control inputs from NOR gates B or S.

The cell and the overall cellular automaton exists in a sequence of discrete states controlled by a centrally generated clock signal TS. At regular intervals this activates bistable N and sends strong signals to change the state of bistable C. By attenuating the signals from N by restrictors (not shown) in the feedback lines, only a very large transfer signal is able to effect the signal transmission. At this high supply power the bistable N is immune from the relatively weak logic signal S from the NOR gates. Hence race hazards are avoided (signals racing round the signal feedback loop out of synchronism with the clock signal).

The fountain display element is bistable C or some other device controlled by it. The cell communicates to others in the array by LIVE (active) signals sent from the appropriate output of bistable C.

Figure 18:
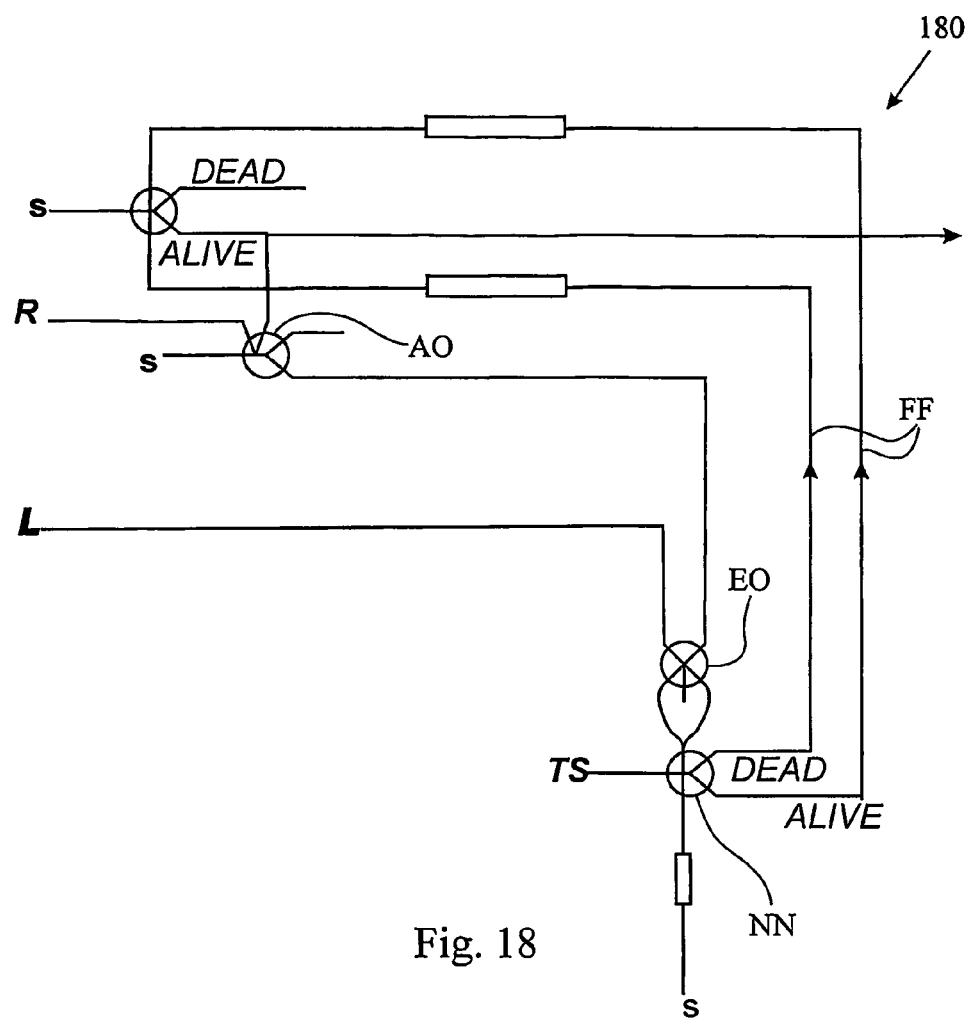
FIG. 18 is a diagram of a simpler logic circuit for a module receiving inputs from just two neighbours.

FIG. 18 shows schematically a possible arrangement of a fluidic logic control module 180. This represents one "cell" of a different cellular automaton to that described above. Here, the logical algorithm and the corresponding circuit implement the "rule 30" automaton discovered and described by Stephen Wolfram, (reference above). The cell exists in a sequence of discrete states, each determined by the state of the cell and its two neighbours. The current state of the cell, ALIVE or DEAD is held in bistable memory element CC. A signal from this, and input signals L and R from left and right neighbouring cells, are processed by a logic circuit consisting of an active OR-gate AO and an exclusive OR-gate EO. The active OR-gate AO is a fluidic monostable switching device and therefore does not attenuate the signal. The exclusive OR-gate EO is not active and therefore also does attenuate the signals.

The output of the exclusive-OR gate EO is the signal fed to bistable memory element NN holding the next state for the cell. The signal from the exclusive OR-gate signifies "ALIVE" for the next state. A bias signal returns the bistable NN to its "DEAD" state in the absence of an output from the exclusive-OR gate. The time-sequence of states for the cell, and the whole automaton, is controlled by a centrally generated clock signal TS. At regular intervals, this activates bistable NN and sends strong signals to change the state of bistable CC. By attenuating the signals from NN by restrictors (not shown) in the feedback lines FF, only a high pressure transfer signal is able to effect the signal transmission. At this high supply power, the bistable NN is immune from the relatively weak logic signals from the exclusive-OR gate and the bias signal. Only when TS is very low or near zero can its state be controlled by the bias or exclusive OR-gate. However at this low supply pressure bistable NN cannot affect bistable CC. This ensures that the "current" and "next" states are separated by finite time periods and that signals do not race around the system out of synchronism with the transfer signals.

Signals to the cell's neighbours are provided by bistable CC. As part of a fountain, bistable C might be a jet diverter, so acting as a display element itself, or it might control other diverters and/or vortex valves.

Wolfram's "rule 30" automaton is defined in terms of a one-dimensional (a line) array and the foregoing description conforms to that definition. Wrapping up linearly connected cells to form a square or other two-dimensional figure can produce two-dimensional arrays. Other two-dimensional arrays can be produced by slight modifications to the interconnections within and between cells. As an example, the next-state bistables could feed signals to cells in a neighbouring row, rather than the internal feedback to bistable CC just described.

The logical function generated by the circuit is

Next-State=L $\underline{v}$(R v Current-State)

where v signifies the OR-function and $\underline{v}$ signifies exclusive-OR

The resulting function is shown in Table III below in which 1 signifies "alive" and 0 "dead.

TABLE III

| L | Current State | R | Next State |
|---|---|---|---|
| 0 | 0 | 0 | 0 |
| 0 | 0 | 1 | 1 |
| 0 | 1 | 0 | 1 |
| 0 | 1 | 1 | 1 |
| 1 | 0 | 0 | 1 |
| 1 | 0 | 1 | 0 |
| 1 | 1 | 0 | 0 |
| 1 | 1 | 1 | 0 |

Figure 19:
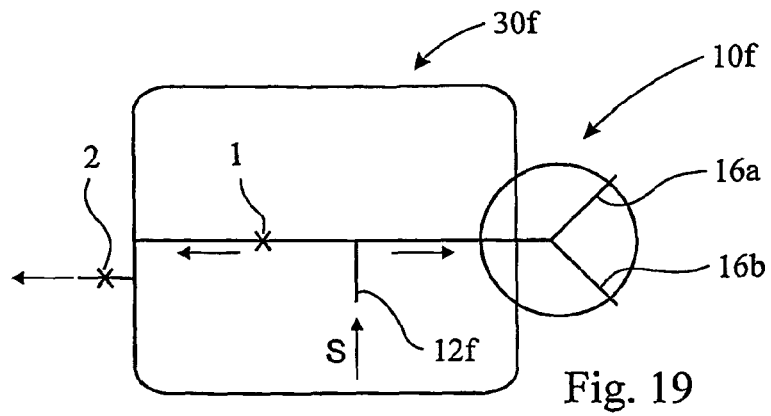
FIG. 19 is a diagram of a circuit for a fountain in accordance with the present invention.

Turning to FIG. 19, a diverter 10f is shown in a circuit 30f in accordance with an embodiment of the present invention. Here, a diverter with fixed construction, particularly a diverter with a fixed length and diameter of control loop 24f, the frequency of oscillation is a function mainly of supply flow 12f. Apart from changing the supply flow, the frequency is difficult to adjust. However, if a small amount of flow is added to or extracted from the control loop, the frequency can be altered. A reason for doing this is to optimise the visual effect of the display. Flow can be added by tapping-off some of the supply flow, which is always at a higher pressure than in the control pipe via valve 1. Flow can be passively bled to atmosphere or pond through valve 2 if the control loop pressure is above that of the atmosphere or the pond.

Adding flow decreases the frequency, and extracting flow increases the frequency. It is not always possible to simply bleed flow from the control loop, however, because for a simple diverter not connected to a vortex valve, the control loop pressure is often too low or may even be sub-atmospheric. A passive bleed valve 2 would then merely admit air, which would be detrimental.

When the diverter is connected to a vortex valve, the control loop pressure is usually higher than atmospheric, so bleeding flow is practical. For the cases where the control loop is at low pressure, a water driven jet pump or ejector (not shown) could be used to suck flow from the control loop 24f (via valve 2).

The ability to inject or extract control loop flow has the added benefit that it can assist in purging the control loop 24f of air when initially switched on. Also it serves to wash debris from the control loop.

In order for the control loop oscillator to oscillate regularly, the output resistance on the diverter (ie on both outlets 16a,b equally in a symmetrical diverter) must be correctly adjusted. If the resistance is too small (i.e no blockage, or a virtually free exit path), the diverter may cease to oscillate because sensitivity or "gain" of the fluidic amplifier (fluidic diverter) drops at high outflows. As the outlet resistance is increased, gain increases and oscillation is easier to ensure. However, if the outlet resistance is too high, the flow cannot be diverted (in the limit at very high resistance, it splits equally between the two outlets 16a,b), so a compromise must be found.

For the diverter 10f acting as a fountain, the two outlets are, in fact, the fountain jets. They are easily accessible and can be adjusted or exchanged to obtain the best effect. For the diverter-switched vortex valve, the outlet resistance is built-in to the overall system. The tangential nozzle (60, FIG. 3a, for example) in the vortex valve 40 forms one diverter outlet resistance (which can be well defined at the design stage), but the other outlet 50 is simply the non-swirling supply duct, typically along the axis of the vortex valve. If this resistance is too small, poor oscillation may occur. Hence it is important to ensure that, if no adjustment can be made, adequate restriction is built in. Alternatively, "fine tuning" may be provided during final commissioning of a device. Such tuning could be made by various known arrangements such as needle-, gate-, butterfly- or ball-type valves.

Figure 20:
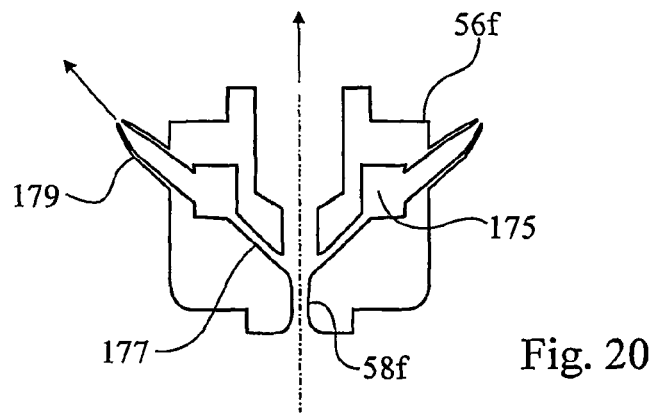
FIG. 20 is a section through a swirl recovery unit.
Figure 21:
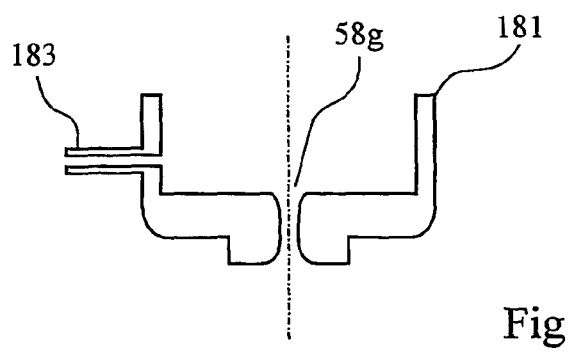
FIG. 21 is a section through a swirl swamper.

Two additional methods of modifying the outflow apply to the switched vortex device, as shown in FIGS. 20 and 21. In the first method, the swirling flow (in the vortex mode of operation) is captured in an annular plenum 175 of vortex valve 56f. An annular diffuser 177 leads from the exit nozzle 58f, which is either flat or conical, as shown. Dynamic pressure in the swirl flow is converted to static pressure in the plenum 175. Nozzle(s) 179 fed from the plenum produce a jet or jets during the vortex phase of operation. The jets 179 can be arranged around the central axis of the vortex valve pointing upwards and outwards to give an intermittent "crown-like" or "flower-like" spray of water on every switching cycle of the device. Alternatively a pressurised water signal can be drawn from the plenum via a pipe to act as a switching signal for other devices. To recover pressure successfully, the annulus 177 must be narrow and its entry point close the vortex nozzle exit 58f, as shown.

The second method involves surrounding the exit nozzle 58g (see FIG. 21) from the vortex valve with a cup-like container 181. Water can be made to submerge the nozzle, thereby modifying the appearance of the outflow. A deeply submerged nozzle produces an attenuated outflow, particularly in the vortex state. The spray can be completely suppressed if desired.

If the cup has a small volume, the contents can quickly get swept away by the outflow, so unless the water is replenished, the effect is transient. If the cup has a large area and volume, the water may be self-replenishing and the effect permanent.

If water flow to and/or from the cup is controlled by some independent means then this enables the appearance of the fountain to be controlled, perhaps by onlookers or by automatic, even fluidic, methods. For example the cup 181 may be provided with an overflow 183, whose exit may be controlled. When full, the cup may only permit the central jet to exit, but when allowed to empty, both the central jet and vortex, modified as the cup fills, may be seen.

A fluidic diverter tends to suck flow into its control ports, even when the outputs are loaded by significant restrictions. It is easy therefore, in principle, to switch manually a diverter (ie one without a closed control loop) simply by blocking one of the control ports. This method has disadvantages however. In a water flow system, the inflow to the control should be water, so the control port to be blocked should be submerged. If air enters, operation is very erratic. Submergence might be inconvenient for many applications. Furthermore, even if submerged, the sucked-in control flow might be a source of contamination by unfiltered pond water, for example.

Figure 22:
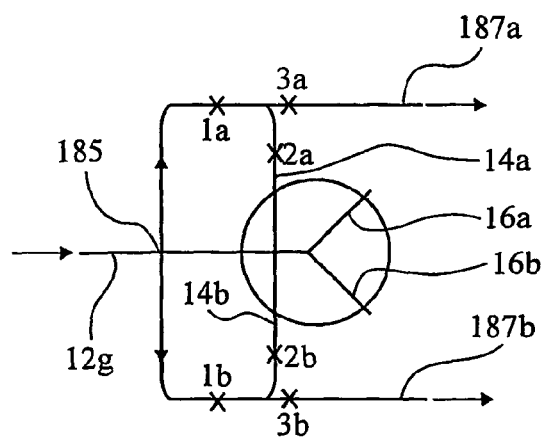
FIG. 22 is a diagram of a circuit modified from FIG. 19 to provide manual control.

A better method of manual control is shown in FIG. 22. This uses a system of restricted feeds and bleeds to enable the blockage of a sensing port to switch the diverter.

In the absence of manual input, small flows feed from tappings 185 of the supply 12g via restrictors 1a an 1b to the control ports 14a,b. Flow is restricted by restrictors 2a and 2b, a slight excess being bled through restrictors 3a and 3b to atmosphere along lines 187a,b. These bleed flows ensure that air, or external pond water, does not enter the system. The restrictors are set to enable the diverter to be stable when there is no manual input.

Blocking one of the bleeds 187a,b manually causes all the flow from the associated flow feed to enter the control port and when properly adjusted, to switch the diverter. The output of such a manually controlled diverter can, in principle, be communicated to any other fluidic device in an array. Indeed, the arrangement could be arranged to be monostable, with only one bleed (eg 187a) being manually operated, the other being permanently sufficient to maintain the flow to output 16a while bleed 187a is unblocked.

Figure 23:
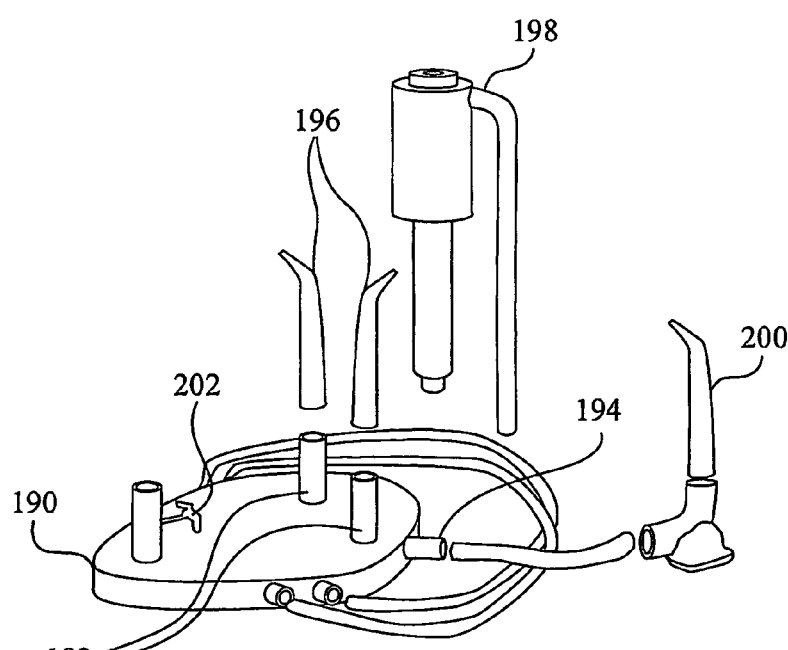
FIG. 23 shows a universal base.

A "universal base" system is shown in FIG. 23. Here, a diverter is embedded in a rather sturdy, and perhaps massive, base block 190 of cement or similar rigid material. Both upward 192, and horizontal 194, outlets are incorporated. Normally, unused outlets would be blocked by a stopper (not shown). The upward outlets 192 can have pipe-mounted nozzles 196 attached, or can feed a vortex valve 198 to produce the alternating spray-jet display. In both cases, the base is sufficient support. Outlying nozzle(s) 200 can be supplied for connection to the horizontal outlets 194.

A purge valve 202 is fed from close to the supply inlet. A tee (not shown) in the control loop can be embedded in the base block. Thus the whole system constitutes a kit of parts which enables several display options to be chosen.

The invention claimed is:

1. A fountain comprising:
   a supply of water under pressure;
   a primary fluidic diverter having an input for said supply, and first and second outputs diverging from said input, two control ports provided with control flow to direct input flow to one or other of said outputs; and
   a vortex amplifier comprising a vortex chamber, a radial port, a vortex inducing port and an axial output port;
   wherein one of said first and second primary diverter outputs is connected to said vortex inducing port and the other is connected to said radial port, said axial port leading to a nozzle whereby an alternating vortex spray or axial jet is produced.

2. A fountain as claimed in claim 1, in which said control ports are interconnected by an inertia loop, whereby oscillations are induced in the control flow to switch flow alternately between said first and second outputs.

3. A fountain as claimed in claim 1, in which said first and second outputs of said diverter are vented to isolate each output from the input.

4. A fountain as claimed in claim 1, in which said outputs have restrictors therein and include feed back loops into said control ports, whereby oscillations are induced in the control flow to switch flow alternately between said first and second outputs.

5. A fountain as claimed in claim 1, in which said diverter is cusped between said first and second outputs to increase stability of flow through said first and second outputs.

6. A fountain as claimed in claim 1, in which said vortex amplifier comprises an annular chamber formed by a tubular housing and central body, supply flow to the amplifier entering said annular chamber at one end, the other end of the annular chamber being terminated by a nozzle plate defining with said central body said vortex chamber, said housing having an opening forming said vortex inducing port.

7. A fountain as claimed in claim 6, in which said vortex inducing port is a passage from a supply chamber outside said housing and arranged tangentially with respect to said vortex chamber.

8. A fountain as claimed in claim 6, in which said vortex inducing port comprises a plurality of said openings in said housing, each opening provided with a vane to tangentially direct radial inflow from a supply chamber surrounding said housing.

9. A fountain as claimed in claim 1, in which said nozzle is interchangeable with different nozzles displaying one of various spray patterns when vortex spray issues therefrom.

10. A fountain as claimed in claim 1, in which a spray catcher is disposed beyond the nozzle to deflect vortex spray issuing from said nozzle, the catcher having an orifice to permit passage of said axial jet to flow unimpeded.

11. A fountain as claimed in claim 10, in which the catcher is inverted so as to destroy entirely said vortex spray.

12. A fountain system incorporating a fountain as claimed in claim 1, in which two of said vortex amplifiers are provided in parallel, each with its own supply to its radial port, each vortex inducing port being connected to one or other of said first and second outputs of the primary diverter.

13. A fountain system as claimed in claim 12, in which said axial outputs of the two vortex amplifiers lead to further components of the system which are arranged to be controlled by greater or lesser flow rates that issue from said axial outputs of the vortex amplifiers depending on whether there is flow into said vortex inducing port.

14. A fountain system incorporating a fountain as claimed in claim 1, in which two of said primary diverters are provided whose first outputs are joined together and comprise the radial input for said vortex amplifier, and whose second outputs are connected to separate vortex inducing ports of said vortex amplifier, whereby several modes of operation of the vortex amplifier results.

15. A fountain system as claimed in claim 14 in which said control ports of each primary diverter are interconnected by an inertia loop, whereby oscillations are induced in the control flow to switch flow alternately between said first and second outputs, and in which said control loops are of different length.

16. A fountain system incorporating a fountain as claimed in claim 1, in which a self-oscillating vortex nozzle is provided, comprising a cylindrical vortex chamber having a central output nozzle and an input comprising a section of the cylindrical wall of the chamber to which an input chamber is connected, a narrowing of the input chamber being provided at the input section of the vortex chamber, whereby flow entering the vortex chamber oscillates between swirling entry and straight radial entry leading to oscillations in the output between a straight jet and a swirling spray.

17. A fountain system incorporating a fountain as claimed in claim 1, in which a wind detection and adjustment device is provided, comprising a catcher for water issuing from a fountain display and falling under no-wind conditions, and a wind control diverter having a supply input, first and second wind control outputs diverging from said supply input, two wind control ports to direct supply input flow to one or other of said outputs, wherein water caught by the catcher is supplied to one control port to direct supply input flow to said first wind control output, the other control port being supplied from a feedback loop from said first wind control output that switches supply input flow to said second wind control output when no water flows from said catcher.

18. A fountain system as claimed in claim 17, in which said first wind control output is connected to the radial port of a fountain supply vortex amplifier to provide a strong flow therethrough, and said second wind control output is connected to a tangential port of a vortex amplifier to provide a weak flow therethrough, output from the fountain supply vortex amplifier supplying the fountain display.

19. A fountain system incorporating a fountain as claimed in claim 1, in which manual control is provided, comprising a manual diverter having a manual input, first and second manual outputs diverging from said manual input, first and second manual control ports to direct said input flow to one or other of said outputs, wherein each control port is supplied by a branch from said manual supply, each branch being controlled by a first restrictor and at least the first control port branch having a second restrictor, a selectively blockable vent being provided between said first and second restrictor whereby, when said vent is blocked, said restrictors are such that control flow is primarily through said first manual control port and, when said vent is not blocked, control flow is primarily through said second port.

20. A fountain system as claimed in claim 19, in which both branches have a second restrictor, and both have a selectively blockable vent between their respective first and second restrictors.

21. A fountain system incorporating a fountain as claimed in claim 1, in which a pilot diverter is provided, comprising a pilot flow input, first and second pilot outputs diverging from said pilot input, two pilot control ports provided with control flow to direct pilot input flow to one or other of said pilot outputs, which pilot outputs comprise the control ports of said primary diverter.

22. A fountain system as claimed in claim 21, in which said pilot diverter is in the form of a logic module receiving a plurality of inputs from different sources whereby the direction of switching of said primary diverter may be dependent on a plurality of factors controlled by said logic module.

23. A fountain system incorporating a fountain as claimed in claim 1, in which multiple logic diverters are provided connected in a logic circuit, wherein each logic diverter has a logic flow input, first and second logic outputs diverging from said logic input, two logic control ports provided with control flow to direct logic input flow to one or other of said logic outputs, which logic outputs supplies the control ports of any other logic diverter, any pilot diverter or said primary diverter.

24. A fountain system as claimed in claim 23, comprising a plurality of diverters, some providing alternating jets directly, and others feeding vortex amplifiers providing alternating jets and sprays, each diverter being controlled by said logic module having a number of inputs, one of said inputs being connected to one output of a neighbouring diverter, and another of said inputs being connected to the other output of said neighbouring diverter or to one output of a different neighbouring diverter.

25. A fountain system as claimed in claim 24, in which a neighbouring diverter for a diverter on one side of the fountain display comprises a diverter on the opposite side of the display, whereby the display is topologically on the surface of a sphere.

26. A fountain system as claimed in claim 25, in which said diverters are arranged in a square formation and each diverter has eight neighbours, said logic module having four inputs on one side and four on the other.

27. A fountain as claimed in claim 1, further comprising:
a control loop interconnecting said control ports to cause oscillation of said direction of the input flow; and
a tapping in said control loop, whereby said control loop may be supplied with water or drained of water to control the frequency of said oscillation.

28. A fountain as claimed in claim 27, in which said tapping is a first tapping connected to said supply, a second bleed tapping being provided in the control loop between said first tapping and one control port, whereby said first tapping admits flow into the control loop, said second tapping drains flow from said control loop, whereby switching of the diverter may be controlled by restricting said drainage.

29. A fountain as claimed in claim 28, in which restrictors are provided around said second tapping to adjust relative flow in the control loop on either side of the second tapping, and into the bleed.

30. A fountain as claimed in claim 28, in which said diverter is arranged to be monostable to one of said output ports, temporary blocking or unblocking of said bleed tapping serving to switch flow to the other of said output ports.

31. A fountain as claimed in claim 28, in which a third bleed tapping is provided in the control loop on the other side of said first tapping remote from said second bleed tapping.

32. A fountain as claimed in claim 1, in which said nozzle opens into an annular diffuser to catch said vortex spray, but not said axial jet, said diffuser opening into an annular pressure plenum.

33. A fountain as claimed in claim 32, in which said plenum is provided with discrete nozzle exits.

\* \* \* \* \*